United States Patent
Hsueh et al.

(10) Patent No.: US 11,982,794 B2
(45) Date of Patent: May 14, 2024

(54) OPTICAL PHOTOGRAPHING SYSTEM, IMAGE CAPTURING APPARATUS AND ELECTRONIC DEVICE

(71) Applicant: LARGAN PRECISION CO., LTD., Taichung (TW)

(72) Inventors: Chun-Che Hsueh, Taichung (TW); Yu-Tai Tseng, Taichung (TW); Hsin-Hsuan Huang, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 0 days.

(21) Appl. No.: 18/172,400

(22) Filed: Feb. 22, 2023

(65) Prior Publication Data
US 2023/0204927 A1 Jun. 29, 2023

Related U.S. Application Data

(60) Continuation of application No. 16/846,632, filed on Apr. 13, 2020, now Pat. No. 11,619,804, which is a
(Continued)

(30) Foreign Application Priority Data

Oct. 5, 2016 (TW) .................................. 105132210

(51) Int. Cl.
*G02B 3/02* (2006.01)
*G02B 9/62* (2006.01)
(Continued)

(52) U.S. Cl.
CPC ........... *G02B 13/0045* (2013.01); *G02B 9/62* (2013.01); *G02B 13/04* (2013.01); *G02B 27/0025* (2013.01)

(58) Field of Classification Search
CPC ...... G02B 9/62; G02B 13/0045; G02B 13/04; G02B 27/0025
(Continued)

(56) References Cited

U.S. PATENT DOCUMENTS 5,216,545 A  6/1993 Saito
9,348,116 B1  5/2016 Chen et al.
(Continued)

FOREIGN PATENT DOCUMENTS

CN  105204144 A  12/2015
CN  105807406 A  7/2016
(Continued)

*Primary Examiner* — Mahidere S Sahle
(74) *Attorney, Agent, or Firm* — McClure, Qualey & Rodack, LLP

(57) ABSTRACT

An optical photographing system includes, in order from an object side to an image side, a first lens element, a second lens element, a third lens element, a fourth lens element, a fifth lens element and a sixth lens element. The first lens element has an image-side surface being convex in a paraxial region thereof. The third lens element has positive refractive power. The fourth lens element has an object-side surface being concave in a paraxial region thereof. The fifth lens element with positive refractive power has two surfaces being both aspheric. The sixth lens element has an image-side surface being concave in a paraxial region thereof, wherein the surfaces of the sixth lens element are both aspheric, and the image-side surface of the sixth lens element includes at least one convex shape in an off-axial region thereof.

21 Claims, 24 Drawing Sheets

Related U.S. Application Data division of application No. 15/420,951, filed on Jan. 31, 2017, now Pat. No. 10,656,383.

(51) Int. Cl.
*G02B 13/00* (2006.01)
*G02B 13/04* (2006.01)
*G02B 13/18* (2006.01)
*G02B 27/00* (2006.01)

(58) Field of Classification Search
USPC .................................. 359/708, 713, 752
See application file for complete search history.

(56) References Cited

U.S. PATENT DOCUMENTS

| | | |
|---|---|---|
| 9,817,215 B2 | 11/2017 | Zhao |
| 2013/0279021 A1 | 10/2013 | Chen et al. |
| 2013/0335833 A1 | 12/2013 | Liao et al. |
| 2014/0368931 A1 | 12/2014 | Noda et al. |
| 2015/0177485 A1 | 6/2015 | Hsu et al. |
| 2016/0018629 A1 | 1/2016 | Tang et al. |
| 2016/0131871 A1 | 5/2016 | Tang et al. |
| 2016/0131873 A1 | 5/2016 | Tang et al. |
| 2016/0187619 A1 | 6/2016 | Tang et al. |
| 2016/0216480 A1 | 7/2016 | Chen et al. |
| 2016/0223796 A1 | 8/2016 | Lee et al. |
| 2016/0223797 A1 | 8/2016 | Zhao |
| 2017/0052346 A1 | 2/2017 | Tang et al. |
| 2017/0052347 A1 | 2/2017 | Tang et al. |
| 2017/0219803 A1 | 8/2017 | Lee et al. |
| 2017/0235109 A1 | 8/2017 | Shin et al. |
| 2017/0269339 A1 | 9/2017 | Jung et al. |
| 2020/0301114 A1 | 9/2020 | Nitta |

FOREIGN PATENT DOCUMENTS

| | | |
|---|---|---|
| CN | 105842824 A | 8/2016 |
| CN | 205485028 U | 8/2016 |
| JP | 09-090222 A | 4/1997 |
| JP | 2015125405 A | 7/2015 |
| JP | 2018116240 A | 7/2018 |
| KR | 20160033673 A | 3/2016 |
| TW | 104126895 | 8/2015 |
| TW | 201533469 A | 9/2015 |

OPTICAL PHOTOGRAPHING SYSTEM, IMAGE CAPTURING APPARATUS AND ELECTRONIC DEVICE

RELATED APPLICATIONS

The present application is a continuation of U.S. application Ser. No. 16/846,632, filed Apr. 13, 2020, which is a Divisional application of the application Ser. No. 15/420,951, filed Jan. 31, 2017, U.S. Pat. No. 10,656,383 issued on May 19, 2020, which claims priority to Taiwan Application Serial Number 105132210, filed Oct. 5, 2016, which are herein incorporated by references.

BACKGROUND

Technical Field

The present disclosure relates to an optical photographing system and an image capturing apparatus. More particularly, the present disclosure relates to an optical photographing system and an image capturing apparatus with a compact size applicable to electronic devices.

Description of Related Art

With the constant growing applications of photographing modules, utilizing photographing modules in various smart electronic devices, portables, smart car systems, recognition devices, entertainment systems, sporting devices and smart home systems is becoming a major trend in developments for future technology. Moreover, in order to obtain more applicable functions, smart devices with one, two or more than three lens assemblies are becoming the market mainstream, and various lens systems with different features are developed in response to different demands.

Compact lens assemblies utilized by the conventional electronic devices have insufficient fields of view, so that the available applications are limited; furthermore, conventional wide-angle lens assemblies usually adopt multi-element lens configuration of spherical glass lens elements, with the size of the lens assemblies being too large and the price being too high to apply to various devices and products. Thus, the conventional photographing systems can no longer keep up with the trend in developments for future technology.

SUMMARY

According to one aspect of the present disclosure, an optical photographing system includes, in order from an object side to an image side, a first lens element, a second lens element, a third lens element, a fourth lens element, a fifth lens element and a sixth lens element. The first lens element has an image-side surface being convex in a paraxial region thereof. The third lens element has positive refractive power. The fourth lens element has an object-side surface being concave in a paraxial region thereof. The fifth lens element with positive refractive power has an object-side surface and an image-side surface being both aspheric. The sixth lens element has an image-side surface being concave in a paraxial region thereof, wherein an object-side surface and the image-side surface of the sixth lens element are both aspheric, and the image-side surface of the sixth lens element includes at least one convex shape in an off-axial region thereof. The optical photographing system has a total of six lens elements. When a focal length of the second lens element is f2, a focal length of the third lens element is f3, a curvature radius of an object-side surface of the first lens element is R1, a curvature radius of the image-side surface of the first lens element is R2, a curvature radius of the object-side surface of the fourth lens element is R7, a curvature radius of an image-side surface of the fourth lens element is R8, a curvature radius of the object-side surface of the fifth lens element is R9, a curvature radius of the image-side surface of the fifth lens element is R10, a curvature radius of the object-side surface of the sixth lens element is R11, and a curvature radius of the image-side surface of the sixth lens element is R12, the following conditions are satisfied:

$|f3/f2|<1.0;$ $|R2/R1|<3.0;$ $-1.45<(R7-R8)/(R7+R8)<0;$ $-5.0<(R9+R10)/(R9-R10)<3.0;$ and $0<(R11-R12)/(R11+R12)<2.0.$ According to another aspect of the present disclosure, an image capturing apparatus includes the optical photographing system of the aforementioned aspect and an image sensor, wherein the image sensor is disposed on an image surface of the optical photographing system.

According to another aspect of the present disclosure, an electronic device 20 includes the image capturing device of the aforementioned aspect.

According to another aspect of the present disclosure, an optical photographing system includes, in order from an object side to an image side, a first lens element, a second lens element, a third lens element, a fourth lens element, a fifth lens element and a sixth lens element. The first lens element with positive refractive power has an image-side surface being convex in a paraxial region thereof. The second lens element has an image-side surface being concave in a paraxial region thereof. The third lens element has positive refractive power. The fourth lens element has an object-side surface being concave in a paraxial region thereof. The fifth lens element with positive refractive power has an object-side surface and an image-side surface being both aspheric. The sixth lens element has an image-side surface being concave in a paraxial region thereof, wherein an object-side surface and the image-side surface of the sixth lens element are both aspheric, and the image-side surface of the sixth lens element includes at least one convex shape in an off-axial region thereof. The optical photographing system has a total of six lens elements. When a focal length of the optical photographing system is f, a focal length of the first lens element is f1, a focal length of the second lens element is f2, a focal length of the third lens element is f3, a curvature radius of an object-side surface of the first lens element is R1, a curvature radius of the image-side surface of the first lens element is R2, and a curvature radius of the object-side surface of the fourth lens element is R7, the following conditions are satisfied:

$|f3/f2|<0.80;$ $|R2/R1|<1.0;$ $|f3/f1|<0.80;$ and $-1.30<R7/f<0.$

According to another aspect of the present disclosure, an optical photographing system includes, in order from an object side to an image side, a first lens element, a second lens element, a third lens element, a fourth lens element, a fifth lens element and a sixth lens element. The first lens element has an object-side surface being concave in a paraxial region thereof. The second lens element has an image-side surface being concave in a paraxial region thereof. The third lens element has positive refractive power. The fourth lens element has an object-side surface being concave in a paraxial region thereof. The fifth lens element with positive refractive power has an object-side surface and an image-side surface being both aspheric. The sixth lens element has an image-side surface being concave in a paraxial region thereof, wherein an object-side surface and the image-side surface of the sixth lens element are both aspheric, and the image-side surface of the sixth lens element includes at least one convex shape in an off-axial region thereof. The optical photographing system has a total of six lens elements. When a focal length of the second lens element is f2, a focal length of the third lens element is f3, a curvature radius of the object-side surface of the fourth lens element is R7, and a curvature radius of an image-side surface of the fourth lens element is R8, the following conditions are satisfied:

$|f3/f2|<1.0$; and $-1.45<(R7-R8)/(R7+R8)<0$.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
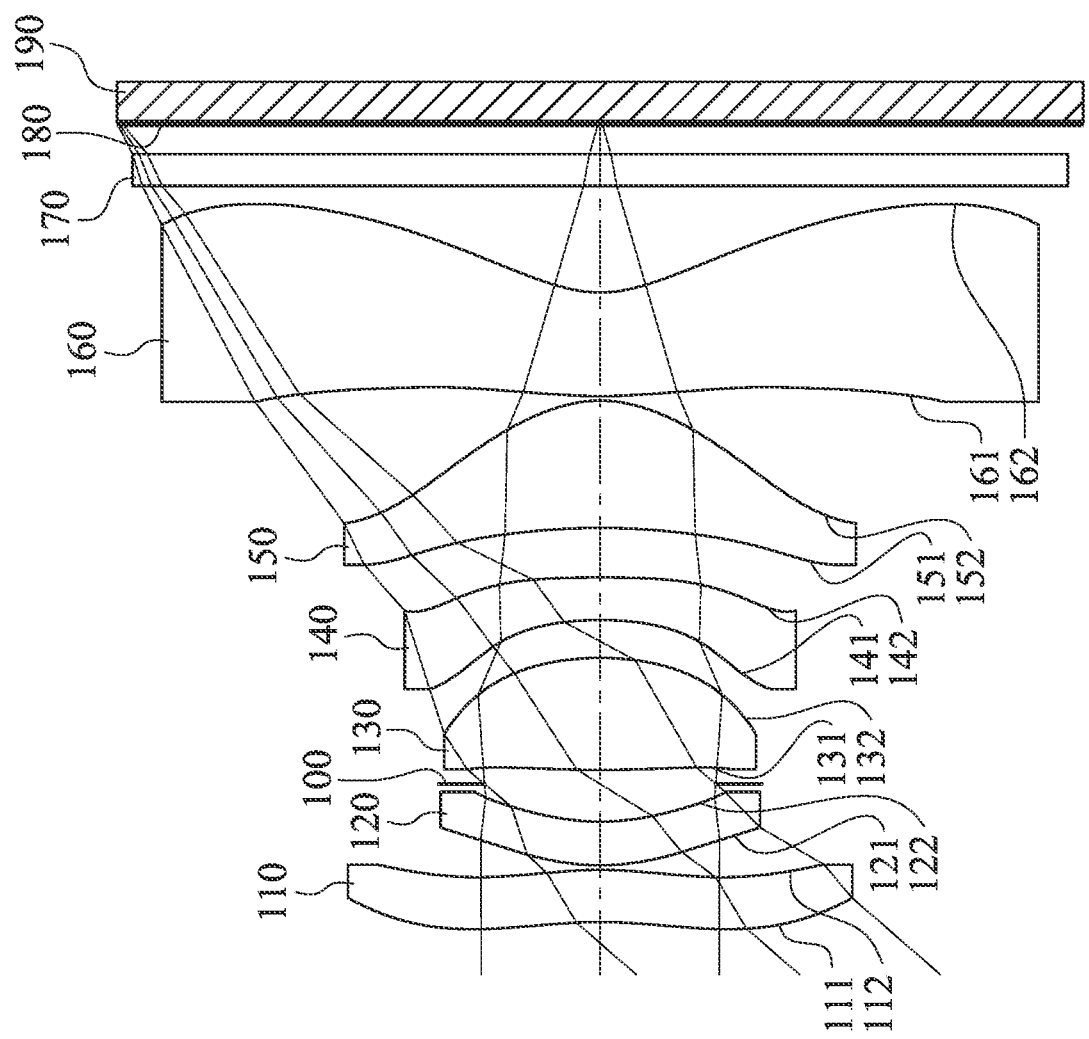
FIG. 1 is a schematic view of an image capturing apparatus according to the 1st embodiment of the present disclosure.

An optical photographing system includes, in order from an object side to an image side, a first lens element, a second lens element, a third lens element, a fourth lens element, a fifth lens element and a sixth lens element. The optical photographing system has a total of six lens elements.

The first lens element can have positive refractive power, so that the excessive distortion can be avoided by balancing the focusing ability of the optical photographing system. The first lens element can have an object-side surface being concave in a paraxial region thereof, so that the spherical aberration can be balanced for avoiding the overcorrection thereof; and the first lens element can have an image-side surface being convex in a paraxial region thereof, so that the light converging ability of the first lens element can be enhanced for obtaining sufficient miniaturizing ability. Furthermore, the object-side surface of the first lens element includes at least one convex shape in an off-axial region thereof, so that it is favorable for reducing the total track length of the optical photographing system and correcting off-axial aberrations.

The second lens element can have an object-side surface being convex in a paraxial region thereof and an image-side surface being concave in a paraxial region thereof. Therefore, it is favorable for retrieving light with a large field of view and enhancing the astigmatism corrections in the optical photographing system.

The third lens element has positive refractive power, so that the main light converging ability of the optical photographing system can be provided for enlarging the field of view and maintaining the compact size. The third lens element can have an image-side surface being convex in a paraxial region thereof, so that the focusing ability thereof can be enhanced which is favorable for forming the symmetrical structure so as to correct the coma aberration.

The fourth lens element can have negative refractive power, so that the positive refractive power of the third lens element can be balanced and the chromatic aberration can be corrected so as to match the focal planes of different wavelengths. The fourth lens element has an object-side surface being concave in a paraxial region thereof, so that the incident angle of the fourth lens element can be smaller for avoiding stray light.

The fifth lens element has positive refractive power, so that it is favorable for forming the retrofocus structure so as to provide a sufficient imaging area. The fifth lens element can have an image-side surface being convex in a paraxial region thereof, so that the distribution of the refractive power of the optical photographing system can be balanced so as to enhance the image quality.

The sixth lens element can have negative refractive power, so that the principal point can be positioned closer to the object side for reducing the back focal length and the total track length. The sixth lens element can have an object-side surface being convex in a paraxial region thereof, so that the distribution of the refractive power of the sixth lens element can be moderated so as to enhance the ability of the sixth lens element for correcting field curvature; the sixth lens element has an image-side surface being concave in a paraxial region thereof, so that the back focal length can be reduced for maintaining compact size. Furthermore, the image-side surface of the sixth lens element includes at least one convex shape in an off-axial region thereof, so that off-axial aberrations can be corrected effectively so as to provide good image quality at the off-axial field.

When a focal length of the second lens element is f2, and a focal length of the third lens element is f3, the following condition is satisfied: $|f3/f2|<1.0$. Therefore, the refractive power of the second lens element and the third lens element can be distributed properly, so that the total track length of the optical photographing system can be controlled and the field of view can be enlarged. Preferably, the following condition can be satisfied: $|f3/f2|<0.80$. More preferably, the following condition can be satisfied: $|f3/f2|<0.50$.

When a curvature radius of the object-side surface of the first lens element is R1, and a curvature radius of the image-side surface of the first lens element is R2, the following condition is satisfied: $|R2/R1|<3.0$. Therefore, it is favorable for obtaining the large field of view and the compact structure characteristic. Preferably, the following condition can be satisfied: $|R2/R1|<1.0$.

When a curvature radius of the object-side surface of the fourth lens element is R7, and a curvature radius of an image-side surface of the fourth lens element is R8, the following condition is satisfied: $-1.45<(R7-R8)/(R7+R8)<0$. Therefore, it is favorable for controlling the surface shape of the fourth lens element effectively so as to balance the optical photographing system and correct the lateral chromatic aberration.

When a curvature radius of the object-side surface of the fifth lens element is R9, and a curvature radius of the image-side surface of the fifth lens element is R10, the following condition is satisfied: $-5.0<(R9+R10)/(R9\oplus R10)<3.0$. Therefore, it is favorable for forming the retrofocus structure and balancing the optical photographing system by the fifth lens element with sufficient control ability. Preferably, the following condition can be satisfied: $-1.0<(R9+R10)/(R9-R10)<2.0$.

When a curvature radius of the object-side surface of the sixth lens element is R11, and a curvature radius of the image-side surface of the sixth lens element is R12, the following condition is satisfied: $0<(R11-R12)/(R11+R12)<2.0$. Therefore, the shape of the sixth lens element can be controlled so as to correct off-axial aberrations.

When the focal length of the third lens element is f3, and a focal length of the first lens element is f1, the following condition is satisfied: $|f3/f1|<0.80$. Therefore, the distribution of the refractive power of the midsection of the optical photographing system can be strengthened so as to balance between the field of view and the size of the optical photographing system.

When the curvature radius of the object-side surface of the fourth lens element is R7, and a focal length of the optical photographing system is f, the following condition is satisfied: $-1.30<R7/f<0$. Therefore, the principal point can be placed at a balanced position, and the Petzval field would not be overly curved due to overcorrection from the excessive back focal length.

When an Abbe number of the second lens element is V2, an Abbe number of the third lens element is V3, and an Abbe number of the fourth lens element is V4, the following condition is satisfied: $0.20<(V2+V4)/V3<1.0$. Therefore, it is favorable for matching and adjusting all of the lens elements so as to adapt a preferable balance with chromatic aberration.

When a curvature radius of the image-side surface of the first lens element is R2, and a maximum image height of the optical photographing system is ImgH, the following condition is satisfied: $-1.50<R2/ImgH<0$. Therefore, it is favorable for balancing the curvature of the image-side surface of the first lens element and the image height so as to reduce image distortion.

When the focal length of the optical photographing system is f, and an entrance pupil diameter of the optical photographing system is EPD, the following condition is satisfied: $1.0<f/EPD<2.20$. Therefore, a large aperture can be obtained so as to increase light coverage on the lens elements from different fields of view, and further improve light entry into the optical photographing system as well as image brightness effectively.

When a half of a maximum field of view of the optical photographing system is HFOV, the following condition is satisfied: $0.95<\tan(HFOV)<2.5$. Therefore, it is favorable for enlarging the angle of view so as to increase the applicable range.

When a refractive power of the first lens element is P1, a refractive power of the second lens element is P2, a refractive power of the third lens element is P3, and a refractive power of the fourth lens element is P4, the following condition is satisfied: $(|P1|+|P2|)/(|P3|+|P4|)<0.30$. Therefore, it is favorable for enhancing the aberration correction in off-axial region on the object side and strengthening the control ability of the third lens element and the fourth lens element so as to improve image quality.

When a central thickness of the second lens element is CT2, and a central thickness of the third lens element is CT3, the following condition is satisfied: $1.90<CT3/CT2<5.0$. Therefore, it is favorable for enhancing the structure strength of midsection of the optical photographing system so as to increase stability while reducing the sensitivity thereof.

When a maximum image height of the optical photographing system is ImgH, and the focal length of the optical photographing system is f, the following condition is satisfied: $0.90<\text{ImgH}/f<1.50$. Therefore, it is favorable for reducing the focal length and obtaining the sufficient light absorbing area so as to reduce axial aberrations while increasing the image illumination.

When the focal length of the optical photographing system is f, and an axial distance between the object-side surface of the first lens element and an image surface is TL, the following condition is satisfied: $0.45<f/\text{TL}<0.70$. Therefore, it is favorable for reducing the focal length of the optical photographing system and increasing the image capturing range.

When a curvature radius of an image-side surface of the third lens element is R6, and the curvature radius of the object-side surface of the fourth lens element is R7, the following condition is satisfied: $-0.37<(R6-R7)/(R6+R7)<0.45$. Therefore, it is favorable for controlling the air space between the third lens element and the fourth lens element so as to balance aberrations of the optical photographing system.

When a focal length of the fifth lens element is f5, and a focal length of the sixth lens element is f6, the following condition is satisfied: $0.70<|f5/f6|<1.0$. Therefore, the distribution of the refractive power of the fifth lens element and the sixth lens element can be controlled so as to balance the field of view and the back focal length.

When the focal length of the optical photographing system is f, and the half of a maximum field of view of the optical photographing system is HFOV, the following condition is satisfied: $1.50 \text{ mm}<f/\tan(\text{HFOV})<3.0 \text{ mm}$. Therefore, the characteristics of compactness and wide-angle of the optical photographing system can be obtained so as to satisfy the wider range of utilization.

When a maximum effective radius of the object-side surface of the first lens element is Y11, and a maximum effective radius of an object-side surface of the third lens element is Y31, the following condition is satisfied: $Y31/Y11<1.10$. Therefore, it is favorable for enhancing the symmetry of the optical photographing system by balancing the sizes of the lens elements.

When an axial distance between the third lens element and the fourth lens element is T34, and an axial distance between the fourth lens element and the fifth lens element is T45, the following condition is satisfied: $0<T45/T34<2.0$. Therefore, the space distribution of the optical photographing system can be controlled effectively which is favorable for abutting and connecting the lens elements so as to increase the yield rate of products.

When a central thickness of the first lens element is CT1, a central thickness of the second lens element is CT2, a central thickness of the third lens element is CT3, a central thickness of the fourth lens element is CT4, and a central thickness of the fifth lens element is CT5, the following condition is satisfied: $(CT1+CT2+CT4)/(CT3+CT5)<0.80$. Therefore, the demands of the structure strength and the distribution of the refractive power of the lens elements can be balanced so as to increase the efficiency of the space usage.

When the axial distance between the object-side surface of the first lens element and the image surface is TL, the following condition is satisfied: $3.0 \text{ mm}<\text{TL}<7.0 \text{ mm}$. Therefore, it is favorable for obtaining the compactness of the optical photographing system for applications in various devices.

The optical photographing system can further include an aperture stop. When an axial distance between the aperture stop and the image-side surface of the sixth lens element is SD, and an axial distance between the object-side surface of the first lens element and the image-side surface of the sixth lens element is TD, the following condition is satisfied: $0.70<\text{SD}/\text{TD}<0.93$. Therefore, it is favorable for balancing the location of the aperture stop so as to obtain a wider image capturing range and maintain the compact characteristic.

When a curvature radius of an object-side surface of the second lens element is R3, and a curvature radius of the image-side surface of the second lens element is R4, the following condition is satisfied: $-0.20<(R3-R4)/(R3+R4)<0.20$. Therefore, the light of tangential and sagittal planes can converge favorably so as to enhance image quality.

When a displacement in parallel with an optical axis from an axial vertex on the object-side surface of the first lens element to a maximum effective radius position on the object-side surface of the first lens element is SAG11, and the maximum effective radius of the object-side surface of the first lens element is Y11, the following condition is satisfied: $|\text{SAG}11/Y11|<0.20$. Therefore, it is favorable for enlarging the field of view and controlling the position of the image point so as to avoid excessive distortion and increase image illumination in the off-axial region.

When the curvature radius of the object-side surface of the fourth lens element is R7, and the maximum image height of the optical photographing system is ImgH, the following condition is satisfied: $-1.0<R7/\text{ImgH}<0$. Therefore, it is favorable for balancing the curvature of the object-side surface of the fourth lens element and the image height so as to enhance image quality.

When a maximum effective radius of the object-side surface of the second lens element is Y21, and the maximum effective radius of an object-side surface of the third lens element is Y31, the following condition is satisfied: $Y31/Y21<1.0$. Therefore, it is favorable for controlling the location of the aperture stop effectively so as to obtain a sufficient field of view.

Each of the aforementioned features of the optical photographing system can be utilized in numerous combinations, so as to achieve the corresponding effects.

According to the optical photographing system of the present disclosure, the lens elements thereof can be made of glass or plastic materials. When the lens elements are made of glass materials, the distribution of the refractive power of the optical photographing system may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical photographing system. Therefore, the total track length of the optical photographing system can also be reduced.

According to the optical photographing system of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the optical photographing system of the present disclosure, the refractive power or the focal length of a lens element being positive or negative may refer to the refractive power or the focal length in a paraxial region of the lens element.

According to the optical photographing system of the present disclosure, the optical photographing system can include at least one stop, such as an aperture stop, a glare stop or a field stop. Said glare stop or said field stop is for eliminating the stray light and thereby improving the image resolution thereof.

According to the optical photographing system of the present disclosure, the image surface of the optical photographing system, based on the corresponding image sensor, can be flat or curved. In particular, the image surface can be a concave curved surface facing towards the object side.

According to the optical photographing system of the present disclosure, an aperture stop can be configured as a middle stop, wherein a middle stop disposed between the first lens element and the image surface is favorable for enlarging the field of view of the optical photographing system and thereby provides a wider field of view for the same.

According to the optical photographing system of the present disclosure, the optical photographing system can be applied to 3D (three-dimensional) image capturing applications, in products such as digital cameras, mobile devices, digital tablets, smart TVs, surveillance systems, motion sensing input devices, driving recording systems, rearview camera systems, and wearable devices.

According to the present disclosure, an image capturing apparatus is provided. The image capturing apparatus includes the aforementioned optical photographing system and an image sensor, wherein the image sensor is disposed on the image side of the aforementioned optical photographing system, that is, the image sensor can be disposed on or near the image surface of the aforementioned optical photographing system. By arranging the third lens element with positive refractive power, the main light converging ability of the optical photographing system can be provided for enlarging field of view and maintaining its compact size, and arranging the fifth lens element with positive refractive power provides the retrofocus structure with a sufficient image capturing range. Furthermore, by arranging the shapes of the object-side surface of the fourth lens element and the image-side surface of the sixth lens element, the stray light can be avoided and the back focal length can be reduced while correcting off-axial aberrations. Preferably, the image capturing apparatus can further include a barrel member, a holder member or a combination thereof.

According to the present disclosure, an electronic device is provided, which includes the aforementioned image capturing apparatus. Preferably, the electronic device can further include but not limited to a control unit, a display, a storage unit, a random access memory unit (RAM) or a combination thereof.

According to the above description of the present disclosure, the following 1st-13th specific embodiments are provided for further explanation.

1st Embodiment

Figure 2:
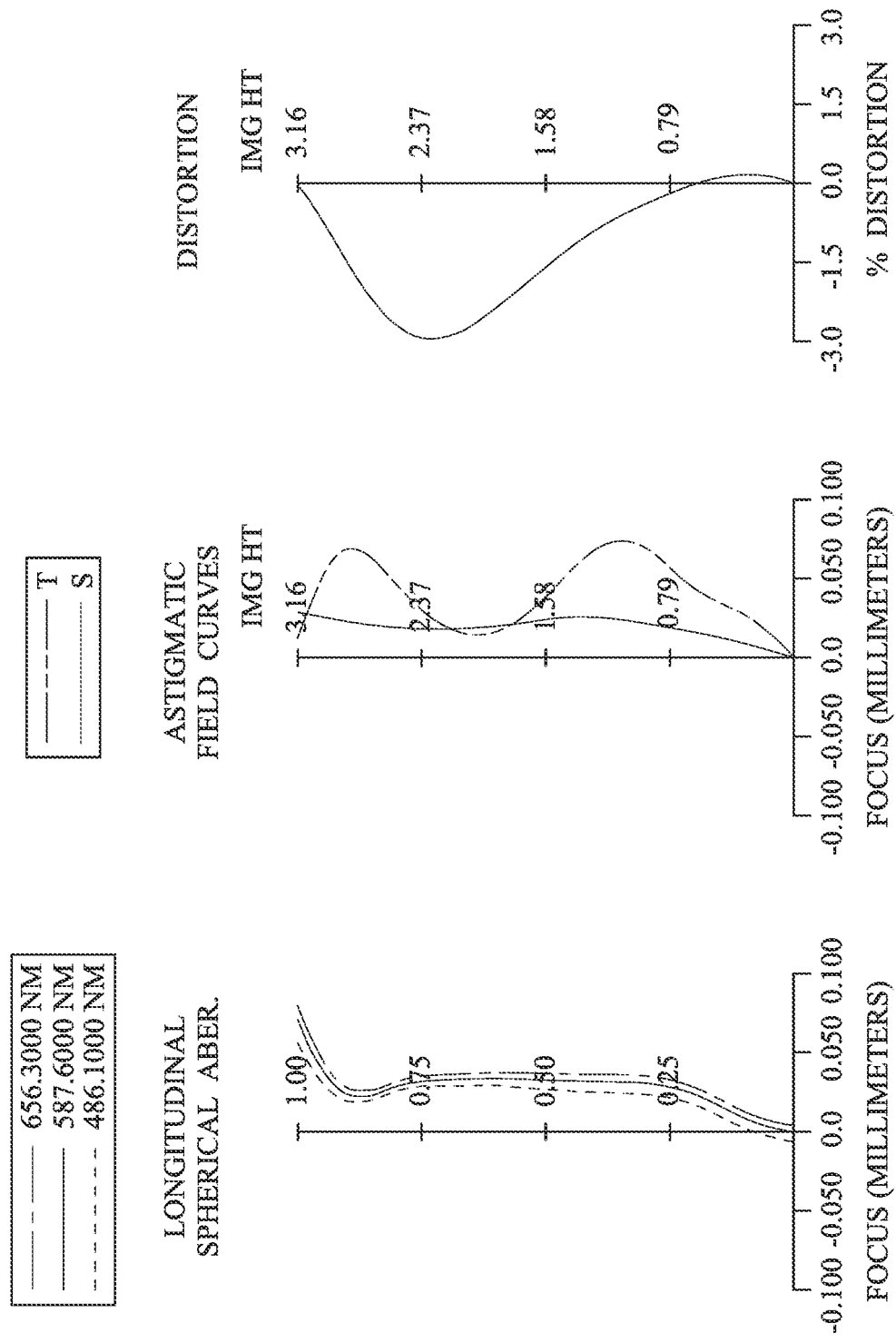
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes an optical photographing system (its reference numeral is omitted) and an image sensor 190. The optical photographing system includes, in order from an object side to an image side, a first lens element 110, a second lens element 120, an aperture stop 100, a third lens element 130, a fourth lens element 140, a fifth lens element 150, a sixth lens element 160, an IR-cut filter 170 and an image surface 180, wherein the image sensor 190 is disposed on the image surface 180 of the optical photographing system. The optical photographing system has a total of six lens elements (110-160).

The first lens element 110 with positive refractive power has an object-side surface 111 being concave in a paraxial region thereof and an image-side surface 112 being convex in a paraxial region thereof. The first lens element 110 is made of a plastic material, and has the object-side surface 111 and the image-side surface 112 being both aspheric. Furthermore, the object-side surface 111 of the first lens element 110 includes at least one convex shape in an off-axial region thereof.

The second lens element 120 with negative refractive power has an object-side surface 121 being convex in a paraxial region thereof and an image-side surface 122 being concave in a paraxial region thereof. The second lens element 120 is made of a plastic material, and has the object-side surface 121 and the image-side surface 122 being both aspheric.

The third lens element 130 with positive refractive power has an object-side surface 131 being convex in a paraxial region thereof and an image-side surface 132 being convex in a paraxial region thereof. The third lens element 130 is made of a plastic material, and has the object-side surface 131 and the image-side surface 132 being both aspheric.

The fourth lens element 140 with negative refractive power has an object-side surface 141 being concave in a paraxial region thereof and an image-side surface 142 being convex in a paraxial region thereof. The fourth lens element 140 is made of a plastic material, and has the object-side surface 141 and the image-side surface 142 being both aspheric.

The fifth lens element 150 with positive refractive power has an object-side surface 151 being concave in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being convex in a paraxial region thereof and an image-side surface 162 being concave in a paraxial region thereof. The sixth lens element 160 is made of a plastic material, and has the object-side surface 161 and the image-side surface 162 being both aspheric. Furthermore, the image-side surface 162 of the sixth lens element 160 includes at least one convex shape in an off-axial region thereof.

The IR-cut filter 170 is made of a glass material and located between the sixth lens element 160 and the image surface 180, and will not affect the focal length of the optical photographing system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_{i}(Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical photographing system according to the 1st embodiment, when a focal length of the optical photographing system is f, an f-number of the optical photographing system is Fno, and half of a maximum field of view of the optical photographing system is HFOV, these parameters have the following values: f=2.73 mm; Fno=1.75; and HFOV=49.0 degrees.

In the optical photographing system according to the 1st embodiment, when an Abbe number of the second lens element 120 is V2, an Abbe number of the third lens element 130 is V3, and an Abbe number of the fourth lens element 140 is V4, the following condition is satisfied: (V2+V4)/V3=0.87.

In the optical photographing system according to the 1st embodiment, when an axial distance between the third lens element 130 and the fourth lens element 140 is T34, and an axial distance between the fourth lens element 140 and the fifth lens element 150 is T45, the following condition is satisfied: T45/T34=1.31.

In the optical photographing system according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, and a central thickness of the fifth lens element 150 is CT5, the following conditions are satisfied: CT3/CT2=2.57; and (CT1+CT2+CT4)/(CT3+CT5)=0.58.

In the optical photographing system according to the 1st embodiment, when a curvature radius of the object-side surface 141 of the fourth lens element 140 is R7, the focal length of the optical photographing system is f, the following condition is satisfied: R7/f=−0.86.

In the optical photographing system according to the 1st embodiment, when a curvature radius of the object-side surface 111 of the first lens element 110 is R1, and a curvature radius of the image-side surface 112 of the first lens element 110 is R2, the following condition is satisfied: |R2/R1|=0.77.

In the optical photographing system according to the 1st embodiment, when a curvature radius of the object-side surface 121 of the second lens element 120 is R3, and a curvature radius of the image-side surface 122 of the second lens element 120 is R4, the following condition is satisfied: (R3−R4)/(R3+R4)=0.06.

In the optical photographing system according to the 1st embodiment, when a curvature radius of the image-side surface 132 of the third lens element 130 is R6, and the curvature radius of the object-side surface 141 of the fourth lens element 140 is R7, the following condition is satisfied: (R6−R7)/(R6+R7)=−0.12.

In the optical photographing system according to the 1st embodiment, when the curvature radius of the object-side surface 141 of the fourth lens element 140 is R7, and a curvature radius of the image-side surface 142 of the fourth lens element 140 is R8, the following condition is satisfied: (R7−R8)/(R7+R8)=−0.68.

In the optical photographing system according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9⊕R10)=1.45.

In the optical photographing system according to the 1st embodiment, when a curvature radius of the object-side surface 161 of the sixth lens element 160 is R11, and a curvature radius of the image-side surface 162 of the sixth lens element 160 is R12, the following condition is satisfied: (R11−R12)/(R11+R12)=0.66.

In the optical photographing system according to the 1st embodiment, when a focal length of the first lens element 110 is f1, a focal length of the second lens element 120 is f2, a focal length of the third lens element 130 is f3, a focal length of the fifth lens element 150 is f5, and a focal length of the sixth lens element 160 is f6, the following conditions are satisfied: |f3/f1|=0.19; |f3/f2|=0.05; and |f5/f6|=0.88.

In the optical photographing system according to the 1st embodiment, when a refractive power of the first lens element 110 is P1 (which is f/f1, a ratio value of the focal length of the optical photographing system f and the focal length of the first lens element f1), a refractive power of the second lens element 120 is P2 (which is f/f2, a ratio value of the focal length of the optical photographing system f and the focal length of the second lens element f2), a refractive power of the third lens element 130 is P3 (which is f/f3, a ratio value of the focal length of the optical photographing system f and the focal length of the third lens element f3), and a refractive power of the fourth lens element is P4 (which is f/f4, a ratio value of the focal length of the optical photographing system f and the focal length of the fourth lens element f4), the following condition is satisfied: (|P1|+|P2|)/(|P3|+|P4|)=0.14.

In the optical photographing system according to the 1st embodiment, when a maximum effective radius of the object-side surface 111 of the first lens element 110 is Y11, a maximum effective radius of the object-side surface 121 of the second lens element 120 is Y21, and a maximum effective radius of the object-side surface 131 of the third lens element 130 is Y31, the following conditions are satisfied: Y31/Y11=0.53; and Y31/Y21=0.83.

In the optical photographing system according to the 1st embodiment, when an axial distance between the aperture stop 100 and the image-side surface 162 of the sixth lens element 160 is SD, and an axial distance between the object-side surface 111 of the first lens element 110 and the image-side surface 162 of the sixth lens element 160 is TD, the following condition is satisfied: SD/TD=0.78.

In the optical photographing system according to the 1st embodiment, when the curvature radius of the image-side surface 112 of the first lens element 110 is R2, the curvature radius of the object-side surface 141 of the fourth lens element 140 is R7, and a maximum image height of the optical photographing system is ImgH (half of a diagonal length of an effective photosensitive area of the image sensor 190), the following conditions are satisfied: R2/ImgH=−0.72; and R7/ImgH=−0.74.

In the optical photographing system according to the 1st embodiment, when the maximum image height of the optical photographing system is ImgH, and the focal length of the optical photographing system is f, the following condition is satisfied: ImgH/f=1.16.

In the optical photographing system according to the 1st embodiment, when the focal length of the optical photographing system is f, and an axial distance between the object-side surface 111 of the first lens element 110 and the image surface 180 is TL, the following conditions are satisfied: f/TL=0.52; and TL=5.25 mm.

In the optical photographing system according to the 1st embodiment, when the focal length of the optical photographing system is f, and an entrance pupil diameter of the optical photographing system is EPD, the following condition is satisfied: f/EPD=1.75.

In the optical photographing system according to the 1st embodiment, when the focal length of the optical photographing system is f, and half of a maximum field of view of the optical photographing system is HFOV, the following conditions are satisfied: f/tan(HFOV)=2.38 mm; and tan (HFOV)=1.15.

Figure 21:
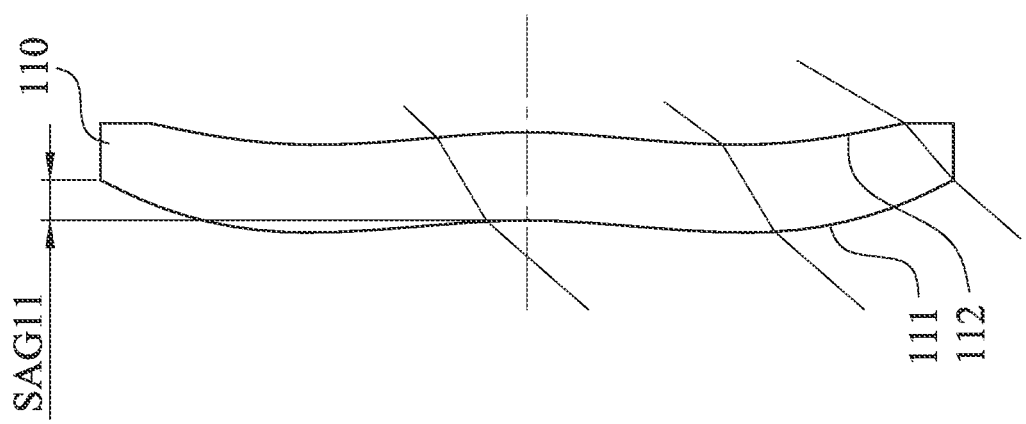
FIG. 21 is a schematic view of a parameter SAG11 according to the 1st embodiment of FIG. 1.

FIG. 21 is a schematic view of a parameter SAG11 according to the 1st embodiment of FIG. 1. In FIG. 21, a displacement in parallel with an optical axis from an axial vertex on the object-side surface 111 of the first lens element 110 to a maximum effective radius position on the object-side surface 111 of the first lens element 110 is SAG11 (when the displacement begins from one point projecting towards the image side, SAG11 is positive; when the displacement projects towards the object side, SAG11 is negative), and the maximum effective radius of the object-side surface 111 of the first lens element 110 is Y11, the following condition is satisfied: |SAG11/Y11|=0.09.

The detailed optical data of the 1st embodiment are shown in Table 1 and the aspheric surface data are shown in Table 2 below.

TABLE 1

1st Embodiment
f = 2.73 mm, Fno = 1.75, HFOV = 49.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.954 | ASP | 0.343 | Plastic | 1.545 | 56.0 | 15.47 |
| 2 | | −2.277 | ASP | 0.030 | | | | |
| 3 | Lens 2 | 1.620 | ASP | 0.286 | Plastic | 1.584 | 28.2 | −59.85 |
| 4 | | 1.448 | ASP | 0.248 | | | | |
| 5 | Ape. Stop | Plano | | 0.093 | | | | |
| 6 | Lens 3 | 9.061 | ASP | 0.735 | Plastic | 1.544 | 55.9 | 2.90 |
| 7 | | −1.854 | ASP | 0.249 | | | | |
| 8 | Lens 4 | −2.344 | ASP | 0.280 | Plastic | 1.660 | 20.4 | −4.45 |
| 9 | | −12.197 | ASP | 0.325 | | | | |
| 10 | Lens 5 | −4.568 | ASP | 0.837 | Plastic | 1.544 | 55.9 | 1.75 |
| 11 | | −0.838 | ASP | 0.030 | | | | |
| 12 | Lens 6 | 3.915 | ASP | 0.680 | Plastic | 1.544 | 55.9 | −2.00 |
| 13 | | 0.798 | ASP | 0.700 | | | | |
| 14 | IR-cut filter | Plano | | 0.210 | Glass | 1.517 | 64.2 | — |
| 15 | | Plano | | 0.202 | | | | |
| 16 | Image | Plano | | — | | | | |

Reference wavelength is 587.6 nm (d-line).

TABLE 2

Aspheric Coefficients

| Surface # | 1 | 2 | 3 | 4 | 6 | 7 |
|---|---|---|---|---|---|---|
| k = | −2.7773E+01 | −5.1205E+01 | −1.3031E+00 | −3.6610E+00 | 4.3226E+01 | −6.4021E−01 |
| A4 = | 1.1654E−01 | 9.4912E−02 | 9.9764E−02 | −1.8903E−01 | −3.6408E−02 | −1.1232E−01 |
| A6 = | −8.3571E−02 | −7.7272E−02 | −7.1587E−01 | 9.0413E−01 | 4.3194E−02 | −2.7144E−01 |
| A8 = | 5.7100E−02 | 8.2441E−02 | 1.5791E+00 | −3.1956E+00 | −3.6047E−01 | 1.1168E+00 |
| A10 = | −2.3403E−02 | −5.3583E−02 | −2.0440E+00 | 7.3047E+00 | 9.1283E−01 | −2.7321E+00 |
| A12 = | 5.2354E−03 | 1.6955E−02 | 1.3601E+00 | −9.3193E+00 | −1.4503E+00 | 3.6644E+00 |
| A14 = | −5.0977E−04 | −2.0899E−03 | −3.4760E−01 | 5.1606E+00 | 8.5756E−01 | −2.6098E+00 |
| A16 = | | | | | | 7.5698E−01 |

| Surface # | 8 | 9 | 10 | 11 | 12 | 13 |
|---|---|---|---|---|---|---|
| k = | 2.5402E+00 | 1.3303E+01 | 3.3348E+00 | −3.6897E+00 | −2.5219E+00 | −4.5314E+00 |
| A4 = | −2.9900E−01 | −2.0158E−01 | 1.3143E−02 | −2.0034E−01 | −1.0076E−01 | −4.8657E−02 |
| A6 = | 7.7957E−02 | 1.7418E−01 | −1.6870E−02 | 2.2247E−01 | 4.2101E−02 | 1.7978E−02 |
| A8 = | 1.7990E−01 | −2.1774E−01 | 3.1928E−02 | −1.8878E−01 | −1.1375E−02 | −4.8074E−03 |
| A10 = | −6.7326E−01 | 2.0072E−01 | −4.8341E−02 | 1.2229E−01 | 2.3476E−03 | 8.2551E−04 |
| A12 = | 1.1892E+00 | −1.1762E−01 | 3.2475E−02 | −4.6454E−02 | −3.7709E−04 | −8.6229E−05 |
| A14 = | −7.8016E−01 | 5.5140E−02 | −9.1933E−03 | 9.1016E−03 | 3.7517E−05 | 4.9223E−06 |
| A16 = | 1.7300E−01 | −1.2470E−02 | 9.3023E−04 | −7.1520E−04 | −1.5775E−06 | −1.1884E−07 |

In Table 1, the curvature radius, the thickness and the focal length are shown in millimeters (mm). Surface numbers 0-16 represent the surfaces sequentially arranged from the object side to the image side along the optical axis. In Table 2, k represents the conic coefficient of the equation of the aspheric surface profiles. A4-A16 represent the aspheric coefficients ranging from the 4th order to the 16th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
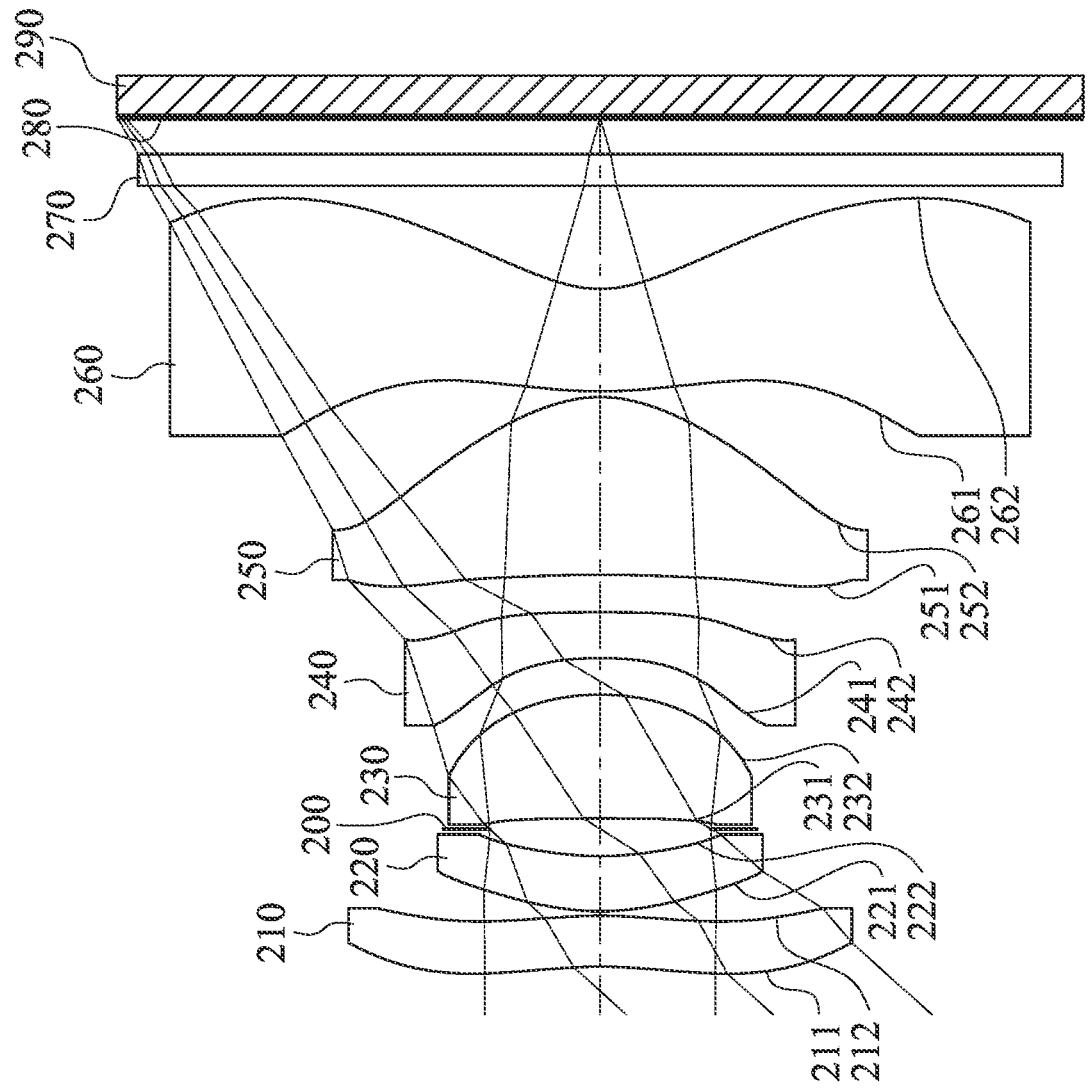
FIG. 3 is a schematic view of an image capturing apparatus according to the 2nd embodiment of the present disclosure.
Figure 4:
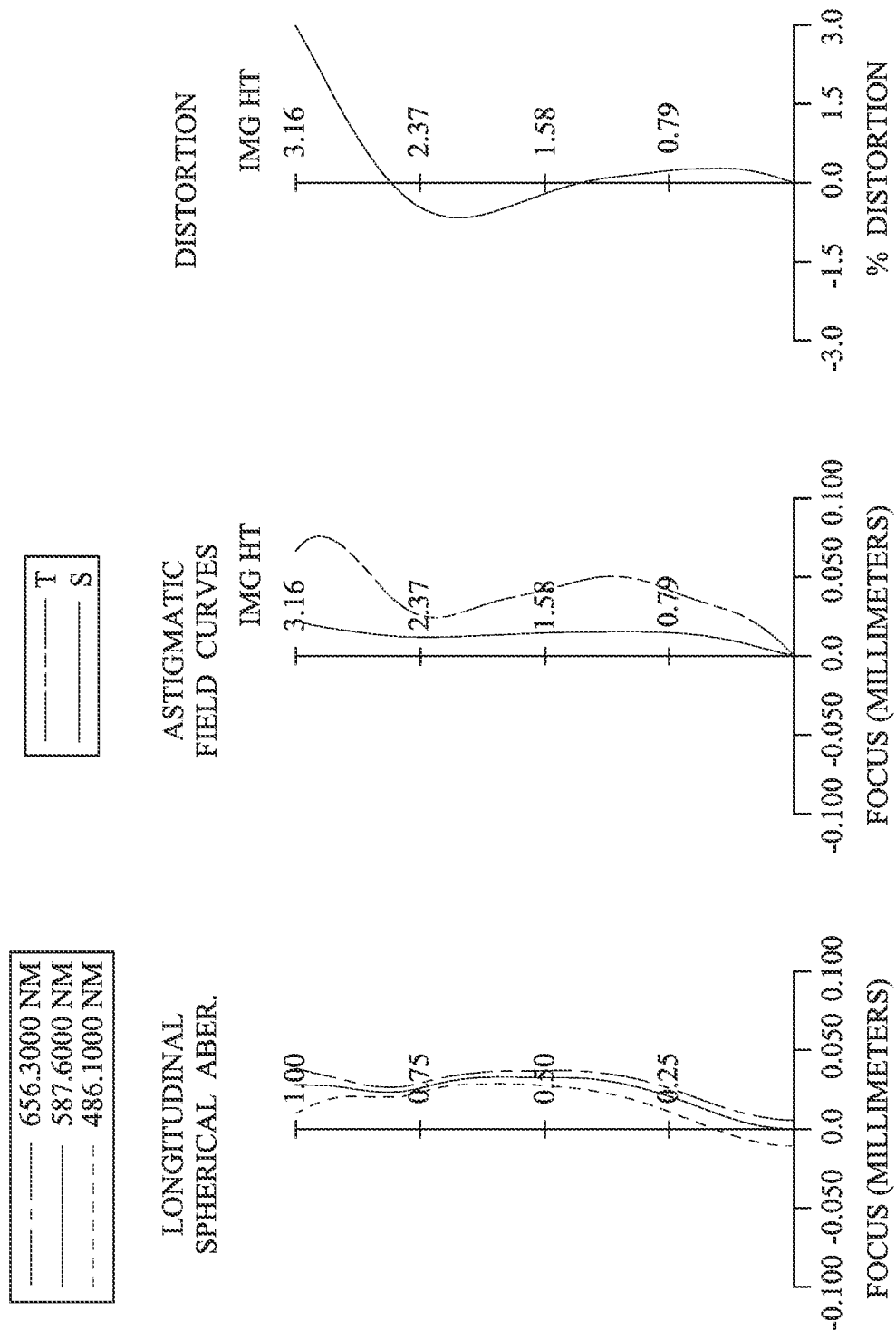
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes an optical photographing system (its reference numeral is omitted) and an image sensor 290. The optical photographing system includes, in order from an object side to an image side, a first lens element 210, a second lens element 220, an aperture stop 200, a third lens element 230, a fourth lens element 240, a fifth lens element 250, a sixth lens element 260, an IR-cut filter 270 and an image surface 280, wherein the image sensor 290 is disposed on the image surface 280 of the optical photographing system. The optical photographing system has a total of six lens elements (210-260).

The first lens element 210 with negative refractive power has an object-side surface 211 being concave in a paraxial region thereof and an image-side surface 212 being convex in a paraxial region thereof. The first lens element 210 is made of a plastic material, and has the object-side surface 211 and the image-side surface 212 being both aspheric. Furthermore, the object-side surface 211 of the first lens element 210 includes at least one convex shape in an off-axial region thereof.

The second lens element 220 with positive refractive power has an object-side surface 221 being convex in a paraxial region thereof and an image-side surface 222 being concave in a paraxial region thereof. The second lens element 220 is made of a plastic material, and has the object-side surface 221 and the image-side surface 222 being both aspheric.

The third lens element 230 with positive refractive power has an object-side surface 231 being concave in a paraxial region thereof and an image-side surface 232 being convex in a paraxial region thereof. The third lens element 230 is made of a plastic material, and has the object-side surface 231 and the image-side surface 232 being both aspheric.

The fourth lens element 240 with negative refractive power has an object-side surface 241 being concave in a paraxial region thereof and an image-side surface 242 being convex in a paraxial region thereof. The fourth lens element 240 is made of a plastic material, and has the object-side surface 241 and the image-side surface 242 being both aspheric.

The fifth lens element 250 with positive refractive power has an object-side surface 251 being concave in a paraxial region thereof and an image-side surface 252 being convex in a paraxial region thereof. The fifth lens element 250 is made of a plastic material, and has the object-side surface 251 and the image-side surface 252 being both aspheric.

The sixth lens element 260 with negative refractive power has an object-side surface 261 being convex in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 262 of the sixth lens element 260 includes at least one convex shape in an off-axial region thereof.

The IR-cut filter 270 is made of a glass material and located between the sixth lens element 260 and the image surface 280, and will not affect the focal length of the optical photographing system.

The detailed optical data of the 2nd embodiment are shown in Table 3 and the aspheric surface data are shown in Table 4 below.

TABLE 3

2nd Embodiment
f = 2.73 mm, Fno = 1.80, HFOV = 48.1 deg.

| Surface# | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.965 | ASP | 0.335 | Plastic | 1.545 | 56.0 | −85.27 |
| 2 | | −3.293 | ASP | 0.030 | | | | |
| 3 | Lens 2 | 1.739 | ASP | 0.364 | Plastic | 1.584 | 28.2 | 12.57 |
| 4 | | 2.103 | ASP | 0.179 | | | | |
| 5 | Ape. Stop | Plano | | 0.069 | | | | |
| 6 | Lens 3 | −36.832 | ASP | 0.817 | Plastic | 1.544 | 55.9 | 3.05 |
| 7 | | −1.597 | ASP | 0.242 | | | | |
| 8 | Lens 4 | −2.484 | ASP | 0.302 | Plastic | 1.660 | 20.4 | −4.03 |
| 9 | | −40.059 | ASP | 0.248 | | | | |
| 10 | Lens 5 | −8.482 | ASP | 1.172 | Plastic | 1.544 | 55.9 | 1.75 |
| 11 | | −0.899 | ASP | 0.038 | | | | |
| 12 | Lens 6 | 3.193 | ASP | 0.675 | Plastic | 1.544 | 55.9 | −2.08 |
| 13 | | 0.772 | ASP | 0.680 | | | | |
| 14 | IR-cut filter | Plano | | 0.210 | Glass | 1.517 | 64.2 | — |
| 15 | | Plano | | 0.244 | | | | |
| 16 | Image | Plano | | — | | | | |

Reference wavelength is 587.6 nm (d-line).

TABLE 4

| Aspheric Coefficients | | | | | | |
|---|---|---|---|---|---|---|
| Surface # | 1 | 2 | 3 | 4 | 6 | 7 |
| k = | −2.7135E+01 | −4.9547E+01 | −1.1055E+00 | −2.7397E+00 | −7.7996E+01 | −6.0856E−01 |
| A4 = | 1.1654E−01 | 9.4912E−02 | −7.5265E−02 | −1.2872E−01 | −6.8293E−02 | −1.3257E−01 |
| A6 = | −8.3571E−02 | −7.7272E−02 | −7.8085E−02 | 3.0995E−01 | 2.9485E−01 | −7.7731E−02 |
| A8 = | 5.7100E−02 | 8.2441E−02 | 2.9768E−01 | −6.2521E−01 | −1.8574E+00 | 1.4341E−01 |
| A10 = | −2.3403E−02 | −5.3583E−02 | −3.9979E−01 | 1.6073E+00 | 5.2818E+00 | 9.9800E−02 |
| A12 = | 5.2354E−03 | 1.6955E−02 | 2.4109E−01 | −2.7079E+00 | −7.7505E+00 | −9.0812E−01 |
| A14 = | −5.0977E−04 | −2.0899E−03 | −4.4463E−02 | 2.1199E+00 | 4.2103E+00 | 1.1726E+00 |
| A16 = | | | | | | −5.1471E−01 |
| Surface# | 8 | 9 | 10 | 11 | 12 | 13 |
| k = | 2.9366E+00 | −6.4510E+01 | 4.1392E+00 | −3.7243E+00 | −6.5754E+00 | −4.0572E+00 |
| A4 = | −3.5257E−01 | −2.1647E−01 | 4.6435E−02 | −1.3119E−01 | −8.7826E−02 | −3.6895E−02 |
| A6 = | 2.1316E−01 | 1.5882E−01 | −6.2337E−03 | 1.3223E−01 | 4.0483E−02 | 7.2213E−03 |
| A8 = | −1.5847E−01 | −1.7236E−01 | −8.9147E−02 | −8.7036E−02 | −3.4784E−02 | −1.1731E−03 |
| A10 = | 6.8116E−02 | 1.3976E−01 | 9.7653E−02 | 3.0869E−02 | 1.9022E−02 | 1.6084E−04 |
| A12 = | 3.4357E−01 | −2.4488E−02 | −4.2594E−02 | −4.7603E−03 | −5.4488E−03 | −1.9497E−05 |
| A14 = | −3.5701E−01 | −1.4613E−02 | 8.6987E−03 | 2.5173E−04 | 7.7545E−04 | 1.5164E−06 |
| A16 = | 1.0063E−01 | 4.8101E−03 | −6.9424E−04 | −4.3033E−06 | −4.3258E−05 | −4.8560E−08 |

In the 2nd embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 2.73 | |f3/f2| | 0.24 |
| Fno | 1.80 | |f5/f6| | 0.84 |
| HFOV [deg.] | 48.1 | (|P1| + |P2|)/(|P3| + |P4|) | 0.16 |
| (V2 + V4)/V3 | 0.87 | Y31/Y11 | 0.46 |
| T45/T34 | 1.02 | Y31/Y21 | 0.71 |
| CT3/CT2 | 2.24 | SD/TD | 0.80 |
| (CT1 + CT2 + CT4)/(CT3 + CT5) | 0.50 | R2/ImgH | −1.04 |
| R7/f | −0.91 | R7/ImgH | −0.79 |
| |R2/R1| | 1.11 | ImgH/f | 1.16 |
| (R3 − R4)/(R3 + R4) | −0.09 | f/TL | 0.49 |
| (R6 − R7)(R6 + R7) | −0.22 | TL [mm] | 5.60 |
| (R7 − R8)/(R7 + R8) | −0.88 | f/EPD | 1.80 |
| (R9 + R10)/(R9 − R10) | 1.24 | f/tan(HFOV) [mm] | 2.45 |
| (R11 − R12)/(R11 + R12) | 0.61 | tan(HFOV) | 1.11 |
| |f3/f1| | 0.04 | |SAG11/Y11| | 0.09 |

3rd Embodiment

Figure 5:
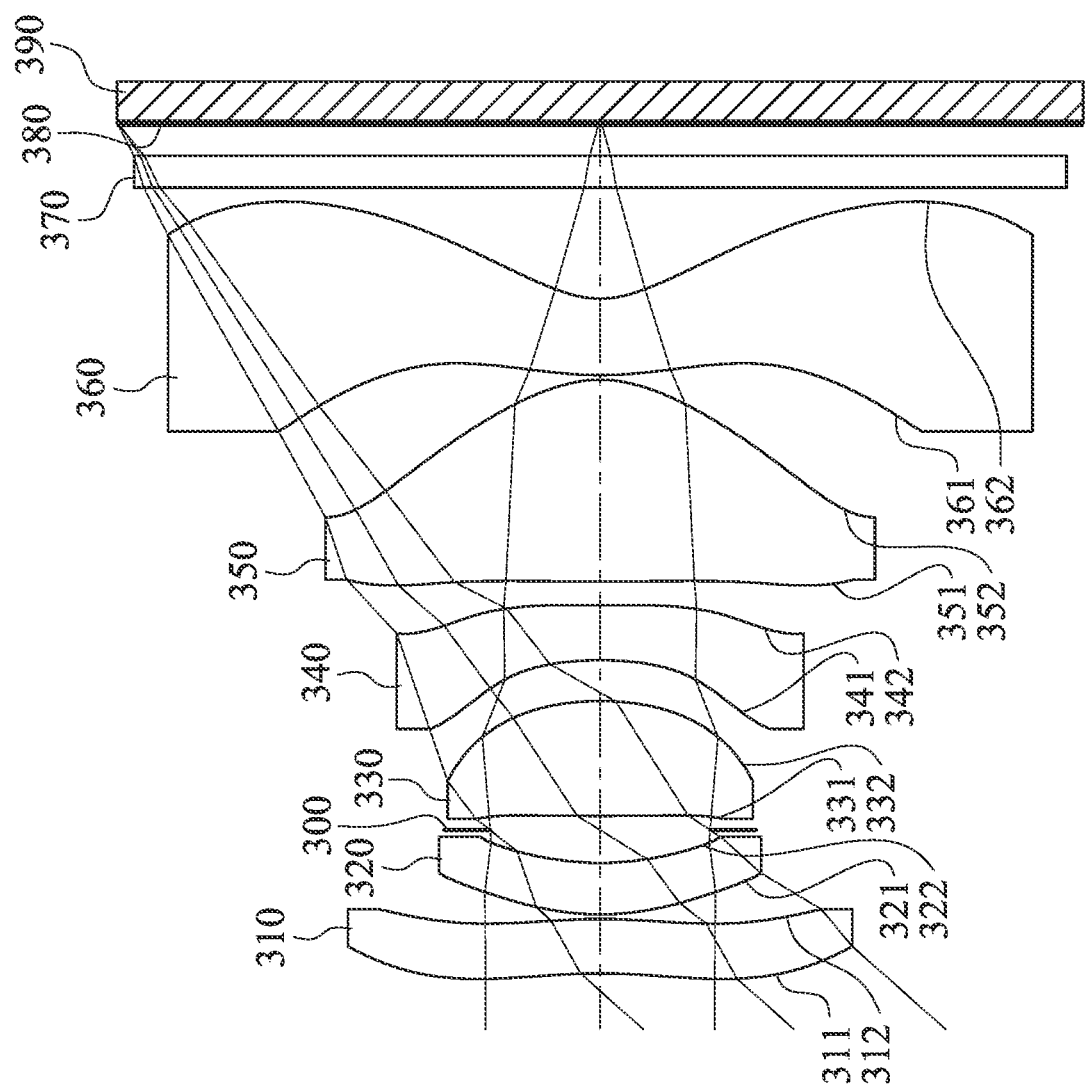
FIG. 5 is a schematic view of an image capturing apparatus according to the 3rd embodiment of the present disclosure.
Figure 6:
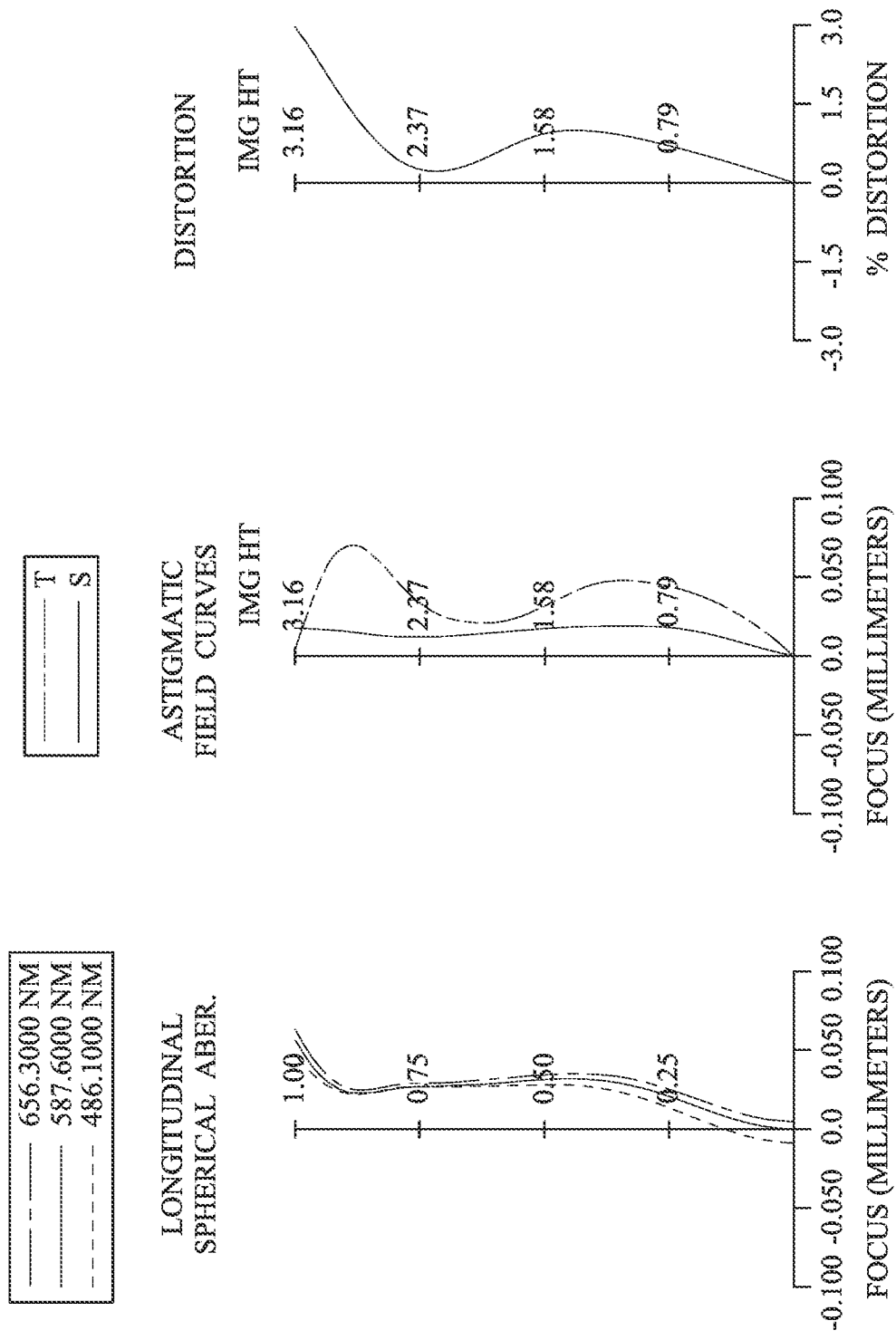
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes an optical photographing system (its reference numeral is omitted) and an image sensor 390. The optical photographing system includes, in order from an object side to an image side, a first lens element 310, a second lens element 320, an aperture stop 300, a third lens element 330, a fourth lens element 340, a fifth lens element 350, a sixth lens element 360, an IR-cut filter 370 and an image surface 380, wherein the image sensor 390 is disposed on the image surface 380 of the optical photographing system. The optical photographing system has a total of six lens elements (310-360).

The first lens element 310 with positive refractive power has an object-side surface 311 being concave in a paraxial region thereof and an image-side surface 312 being convex in a paraxial region thereof. The first lens element 310 is made of a plastic material, and has the object-side surface 311 and the image-side surface 312 being both aspheric. Furthermore, the object-side surface 311 of the first lens element 310 includes at least one convex shape in an off-axial region thereof.

The second lens element 320 with positive refractive power has an object-side surface 321 being convex in a paraxial region thereof and an image-side surface 322 being concave in a paraxial region thereof. The second lens element 320 is made of a plastic material, and has the object-side surface 321 and the image-side surface 322 being both aspheric.

The third lens element 330 with positive refractive power has an object-side surface 331 being convex in a paraxial region thereof and an image-side surface 332 being convex in a paraxial region thereof. The third lens element 330 is made of a plastic material, and has the object-side surface 331 and the image-side surface 332 being both aspheric.

The fourth lens element 340 with negative refractive power has an object-side surface 341 being concave in a paraxial region thereof and an image-side surface 342 being concave in a paraxial region thereof. The fourth lens element 340 is made of a plastic material, and has the object-side surface 341 and the image-side surface 342 being both aspheric.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric.

The sixth lens element 360 with negative refractive power has an object-side surface 361 being convex in a paraxial region thereof and an image-side surface 362 being concave in a paraxial region thereof. The sixth lens element 360 is made of a plastic material, and has the object-side surface 361 and the image-side surface 362 being both aspheric. Furthermore, the image-side surface 362 of the sixth lens element 360 includes at least one convex shape in an off-axial region thereof.

The IR-cut filter 370 is made of a glass material and located between the sixth lens element 360 and the image surface 380, and will not affect the focal length of the optical photographing system.

The detailed optical data of the 3rd embodiment are shown in Table 5 and the aspheric surface data are shown in Table 6 below.

TABLE 5

3rd Embodiment
f = 2.71 mm, Fno = 1.80, HFOV = 48.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.571 | ASP | 0.357 | Plastic | 1.584 | 28.2 | 129.21 |
| 2 | | −3.536 | ASP | 0.030 | | | | |
| 3 | Lens 2 | 1.742 | ASP | 0.338 | Plastic | 1.634 | 23.8 | 26.44 |
| 4 | | 1.798 | ASP | 0.216 | | | | |
| 5 | Ape. Stop | Plano | | 0.093 | | | | |
| 6 | Lens 3 | 17.645 | ASP | 0.755 | Plastic | 1.544 | 56.0 | 3.05 |
| 7 | | −1.805 | ASP | 0.268 | | | | |
| 8 | Lens 4 | −2.628 | ASP | 0.363 | Plastic | 1.660 | 20.4 | −3.64 |
| 9 | | 29.880 | ASP | 0.155 | | | | |
| 10 | Lens 5 | 30.591 | ASP | 1.326 | Plastic | 1.544 | 56.0 | 1.46 |
| 11 | | −0.805 | ASP | 0.030 | | | | |
| 12 | Lens 6 | 2.386 | ASP | 0.502 | Plastic | 1.544 | 56.0 | −1.68 |
| 13 | | 0.612 | ASP | 0.730 | | | | |
| 14 | IR-cut filter | Plano | | 0.210 | Glass | 1.517 | 64.2 | — |
| 15 | | Plano | | 0.213 | | | | |
| 16 | Image | Plano | | — | | | | |

Reference wavelength is 587.6 nm (d-line).

TABLE 6

Aspheric Coefficients

| Surface # | 1 | 2 | 3 | 4 | 6 | 7 |
|---|---|---|---|---|---|---|
| k = | −2.9793E+01 | −6.7989E+01 | −8.2477E−01 | −2.0355E+00 | 9.0000E+01 | −2.1601E−01 |
| A4 = | 1.1654E−01 | 9.4912E−02 | −2.7290E−02 | −1.2079E−01 | −5.8680E−02 | −1.6004E−01 |
| A6 = | −8.3571E−02 | −7.7272E−02 | −1.6979E−01 | 4.4229E−01 | 2.1755E−01 | −1.2191E−01 |
| A8 = | 5.7100E−02 | 8.2441E−02 | 4.1379E−01 | −1.4558E+00 | −1.2710E+00 | 5.7650E−01 |
| A10 = | −2.3403E−02 | −5.3583E−02 | −5.3006E−01 | 4.0083E+00 | 3.1694E+00 | −1.3667E+00 |
| A12 = | 5.2354E−03 | 1.6955E−02 | 3.2904E−01 | −6.2109E+00 | −4.3063E+00 | 1.5789E+00 |
| A14 = | −5.0977E−04 | −2.0899E−03 | −6.7121E−02 | 4.2203E+00 | 2.2617E+00 | −9.0174E−01 |
| A16 = | | | | | | 1.6589E−01 |

| Surface # | 8 | 9 | 10 | 11 | 12 | 13 |
|---|---|---|---|---|---|---|
| k = | 3.4586E+00 | −9.0000E+01 | −8.7976E+01 | −4.0731E+00 | −9.1757E+00 | −3.6725E+00 |
| A4 = | −4.1038E−01 | −2.8957E−01 | −3.4243E−02 | −1.3994E−01 | −1.2970E−01 | −5.3850E−02 |
| A6 = | 4.2581E−01 | 3.2277E−01 | 5.7107E−02 | 1.3096E−01 | 7.8130E−02 | 1.6658E−02 |
| A8 = | −7.6348E−01 | −3.9586E−01 | −1.0440E−01 | −7.5723E−02 | −5.6266E−02 | −4.2912E−03 |
| A10 = | 1.1437E+00 | 3.3909E−01 | 8.5837E−02 | 2.3742E−02 | 2.6401E−02 | 8.0007E−04 |
| A12 = | −7.2810E−01 | −1.4775E−01 | −3.3587E−02 | −2.9479E−03 | −6.8175E−03 | −9.7948E−05 |
| A14 = | 1.9180E−01 | 3.0452E−02 | 6.4097E−03 | −4.6856E−06 | 8.9492E−04 | 6.7245E−06 |
| A16 = | −1.2502E−02 | −2.2467E−03 | −4.8528E−04 | 1.6681E−05 | −4.6673E−05 | −1.9305E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 2.71 | $|f3/f2|$ | 0.12 |
| Fno | 1.80 | $|f5/f6|$ | 0.87 |
| HFOV [deg.] | 48.4 | $(|P1| + |P2|)/(|P3| + |P4|)$ | 0.08 |
| (V2 + V4)/V3 | 0.79 | Y31/Y11 | 0.50 |
| T45/T34 | 0.58 | Y31/Y21 | 0.78 |
| CT3/CT2 | 2.23 | SD/TD | 0.79 |

-continued

| 3rd Embodiment | | | |
|---|---|---|---|
| (CT1 + CT2 + CT4)/(CT3 + CT5) | 0.51 | R2/ImgH | −1.12 |
| R7/f | −0.97 | R7/ImgH | −0.83 |
| |R2/R1| | 0.99 | ImgH/f | 1.17 |
| (R3 − R4)/(R3 + R4) | −0.02 | f/TL | 0.49 |
| (R6 − R7)(R6 + R7) | −0.19 | TL [mm] | 5.59 |
| (R7 − R8)/(R7 + R8) | −1.19 | f/EPD | 1.80 |
| (R9 + R10)/(R9 − R10) | 0.95 | f/tan(HFOV) [mm] | 2.41 |
| (R11 − R12)/(R11 + R12) | 0.59 | tan(HFOV) | 1.12 |
| |f3/f1| | 0.02 | |SAG11/Y11| | 0.11 |

4th Embodiment

Figure 7:
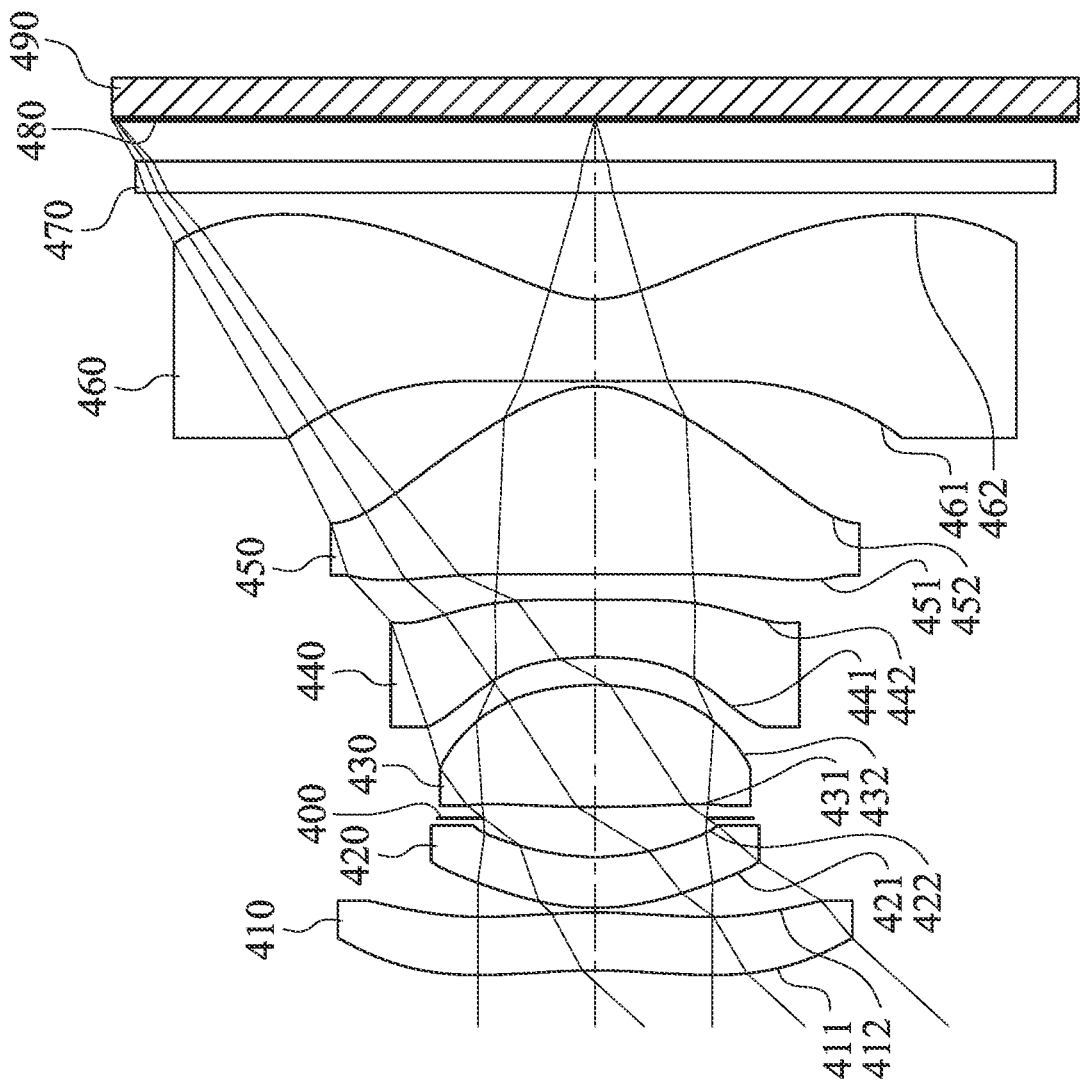
FIG. 7 is a schematic view of an image capturing apparatus according to the 4th embodiment of the present disclosure.
Figure 8:
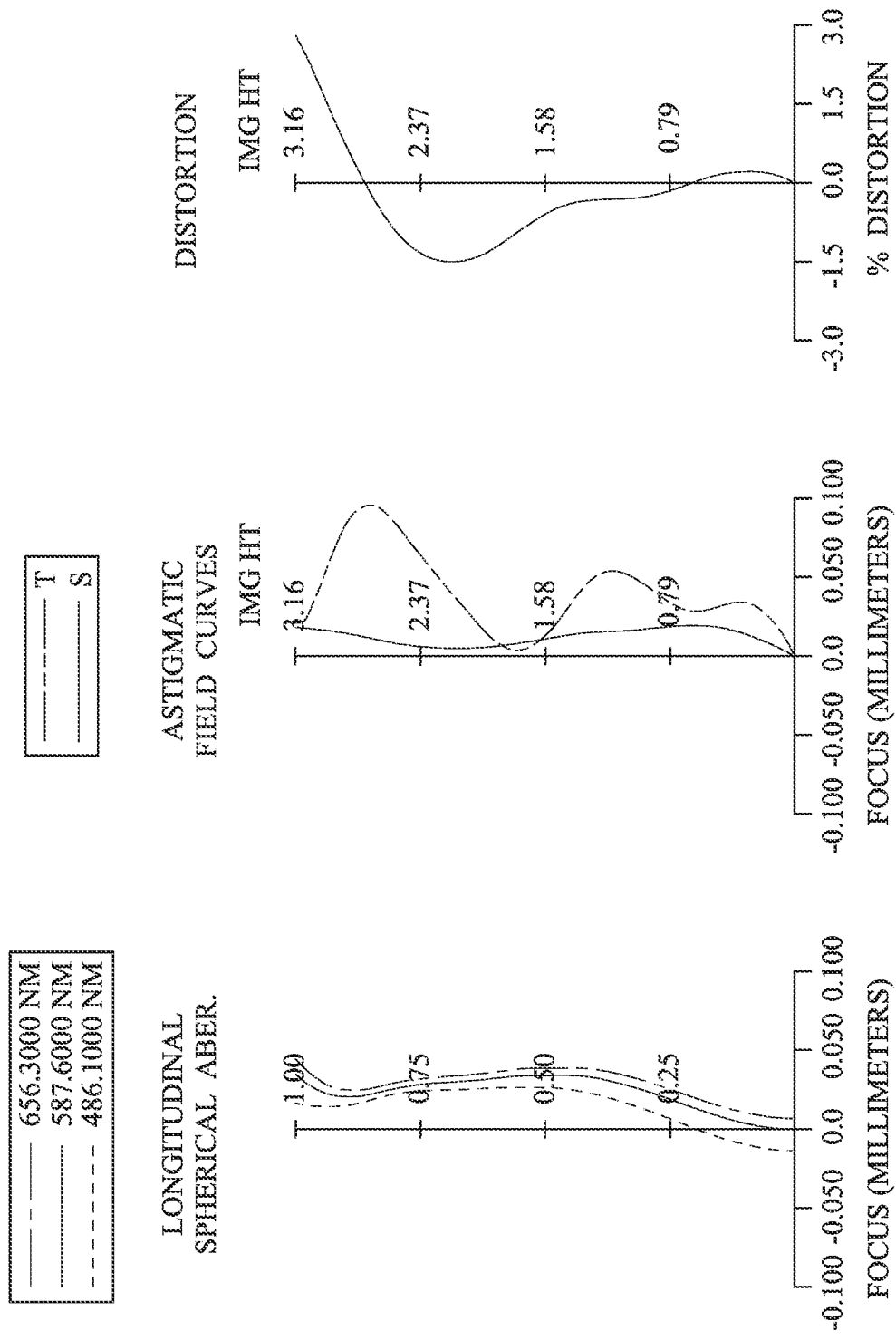
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes an optical photographing system (its reference numeral is omitted) and an image sensor 490. The optical photographing system includes, in order from an object side to an image side, a first lens element 410, a second lens element 420, an aperture stop 400, a third lens element 430, a fourth lens element 440, a fifth lens element 450, a sixth lens element 460, an IR-cut filter 470 and an image surface 480, wherein the image sensor 490 is disposed on the image surface 480 of the optical photographing system. The optical photographing system has a total of six lens elements (410-460).

The first lens element 410 with positive refractive power has an object-side surface 411 being concave in a paraxial region thereof and an image-side surface 412 being convex in a paraxial region thereof. The first lens element 410 is made of a plastic material, and has the object-side surface 411 and the image-side surface 412 being both aspheric. Furthermore, the object-side surface 411 of the first lens element 410 includes at least one convex shape in an off-axial region thereof.

The second lens element 420 with positive refractive power has an object-side surface 421 being convex in a paraxial region thereof and an image-side surface 422 being concave in a paraxial region thereof. The second lens element 420 is made of a plastic material, and has the object-side surface 421 and the image-side surface 422 being both aspheric.

The third lens element 430 with positive refractive power has an object-side surface 431 being convex in a paraxial region thereof and an image-side surface 432 being convex in a paraxial region thereof. The third lens element 430 is made of a plastic material, and has the object-side surface 431 and the image-side surface 432 being both aspheric.

The fourth lens element 440 with negative refractive power has an object-side surface 441 being concave in a paraxial region thereof and an image-side surface 442 being concave in a paraxial region thereof. The fourth lens element 440 is made of a plastic material, and has the object-side surface 441 and the image-side surface 442 being both aspheric.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being concave in a paraxial region thereof. The sixth lens element 460 is made of a plastic material, and has the object-side surface 461 and the image-side surface 462 being both aspheric. Furthermore, the image-side surface 462 of the sixth lens element 460 includes at least one convex shape in an off-axial region thereof.

The IR-cut filter 470 is made of a glass material and located between the sixth lens element 460 and the image surface 480, and will not affect the focal length of the optical photographing system.

The detailed optical data of the 4th embodiment are shown in Table 7 and the aspheric surface data are shown in Table 8 below.

TABLE 7

4th Embodiment
f = 2.78 mm, Fno = 1.80, HFOV = 47.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.955 | ASP | 0.381 | Plastic | 1.584 | 28.2 | 105.58 |
| 2 | | −3.848 | ASP | 0.030 | | | | |
| 3 | Lens 2 | 1.575 | ASP | 0.335 | Plastic | 1.634 | 23.8 | 41.75 |
| 4 | | 1.536 | ASP | 0.256 | | | | |
| 5 | Ape. Stop | Plano | | 0.074 | | | | |
| 6 | Lens 3 | 8.108 | ASP | 0.802 | Plastic | 1.544 | 56.0 | 2.92 |
| 7 | | −1.907 | ASP | 0.184 | | | | |
| 8 | Lens 4 | −2.616 | ASP | 0.377 | Plastic | 1.634 | 23.8 | −3.55 |
| 9 | | 16.985 | ASP | 0.169 | | | | |
| 10 | Lens 5 | 25.857 | ASP | 1.237 | Plastic | 1.544 | 56.0 | 1.18 |
| 11 | | −0.647 | ASP | 0.034 | | | | |
| 12 | Lens 6 | −576.031 | ASP | 0.539 | Plastic | 1.544 | 56.0 | −1.19 |
| 13 | | 0.647 | ASP | 0.700 | | | | |
| 14 | IR-cut filter | Plano | | 0.210 | Glass | 1.517 | 64.2 | — |
| 15 | | Plano | | 0.275 | | | | |
| 16 | Image | Plano | | — | | | | |

Reference wavelength is 587.6 nm (d-line).

TABLE 8

Aspheric Coefficients

| Surface # | 1 | 2 | 3 | 4 | 6 | 7 |
|---|---|---|---|---|---|---|
| k = | −3.4700E+01 | −6.9796E+01 | −1.0479E+00 | −2.1112E+00 | 6.7230E+01 | −2.2307E−02 |
| A4 = | 1.1654E−01 | 9.4912E−02 | −4.1238E−02 | −1.1884E−01 | −5.9095E−02 | −1.7569E−01 |
| A6 = | −8.3571E−02 | −7.7272E−02 | −1.5962E−01 | 4.7745E−01 | 2.4920E−01 | −2.8477E−01 |
| A8 = | 5.7100E−02 | 8.2441E−02 | 4.3579E−01 | −1.7508E+00 | −1.3937E+00 | 1.3417E+00 |
| A10 = | −2.3403E−02 | −5.3583E−02 | −5.8996E−01 | 4.8233E+00 | 3.3901E+00 | −2.9665E+00 |
| A12 = | 5.2354E−03 | 1.6955E−02 | 3.7879E−01 | −7.1760E+00 | −4.4306E+00 | 3.4707E+00 |
| A14 = | −5.0977E−04 | −2.0899E−03 | −8.1921E−02 | 4.5798E+00 | 2.2079E+00 | −2.1183E+00 |
| A16 = | | | | | | 5.0876E−01 |

| Surface # | 8 | 9 | 10 | 11 | 12 | 13 |
|---|---|---|---|---|---|---|
| k = | 3.3810E+00 | 7.5819E+01 | −9.0000E+01 | −3.7746E+00 | −9.0000E+01 | −5.3845E+00 |
| A4 = | −3.8977E−01 | −2.6378E−01 | −8.7487E−02 | −1.6322E−01 | 3.6620E−02 | −1.1250E−02 |
| A6 = | 1.2779E−01 | 2.8497E−01 | 1.6889E−01 | 2.0326E−01 | −5.2839E−02 | −7.5004E−03 |
| A8 = | 2.1948E−01 | −3.2883E−01 | −2.2295E−01 | −1.6445E−01 | 7.8507E−03 | 3.1407E−03 |
| A10 = | −4.4977E−01 | 2.7157E−01 | 1.5554E−01 | 8.2126E−02 | 7.3382E−03 | −5.5668E−04 |
| A12 = | 5.9313E−01 | −1.2629E−01 | −5.6734E−02 | −2.3414E−02 | −3.5461E−03 | 4.6957E−05 |
| A14 = | −3.1953E−01 | 3.4686E−02 | 1.0532E−02 | 3.6206E−03 | 5.9556E−04 | −1.5003E−06 |
| A16 = | 5.4226E−02 | −4.7403E−03 | −7.9444E−04 | −2.4011E−04 | −3.5341E−05 | −6.4760E−09 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 2.78 | |f3/f2| | 0.07 |
| Fno | 1.80 | |f5/f6| | 0.99 |
| HFOV [deg.] | 47.7 | (|P1| + |P2|)/(|P3| + |P4|) | 0.05 |
| (V2 + V4)/V3 | 0.85 | Y31/Y11 | 0.50 |
| T45/T34 | 0.92 | Y31/Y21 | 0.78 |
| CT3/CT2 | 2.39 | SD/TD | 0.77 |
| (CT1 + CT2 + CT4)/(CT3 + CT5) | 0.54 | R2/ImgH | −1.22 |
| R7/f | −0.94 | R7/ImgH | −0.83 |
| |R2/R1| | 0.97 | ImgH/f | 1.14 |
| (R3 − R4)/(R3 + R4) | 0.01 | f/TL | 0.50 |
| (R6 − R7)(R6 + R7) | −0.16 | TL [mm] | 5.60 |
| (R7 − R8)/(R7 + R8) | −1.36 | f/EPD | 1.80 |
| (R9 + R10)/(R9 − R10) | 0.95 | f/tan(HFOV) [mm] | 2.53 |
| (R11 − R12)/(R11 + R12) | 1.00 | tan(HFOV) | 1.10 |
| |f3/f1| | 0.03 | |SAG11/Y11| | 0.12 |

5th Embodiment

Figure 9:
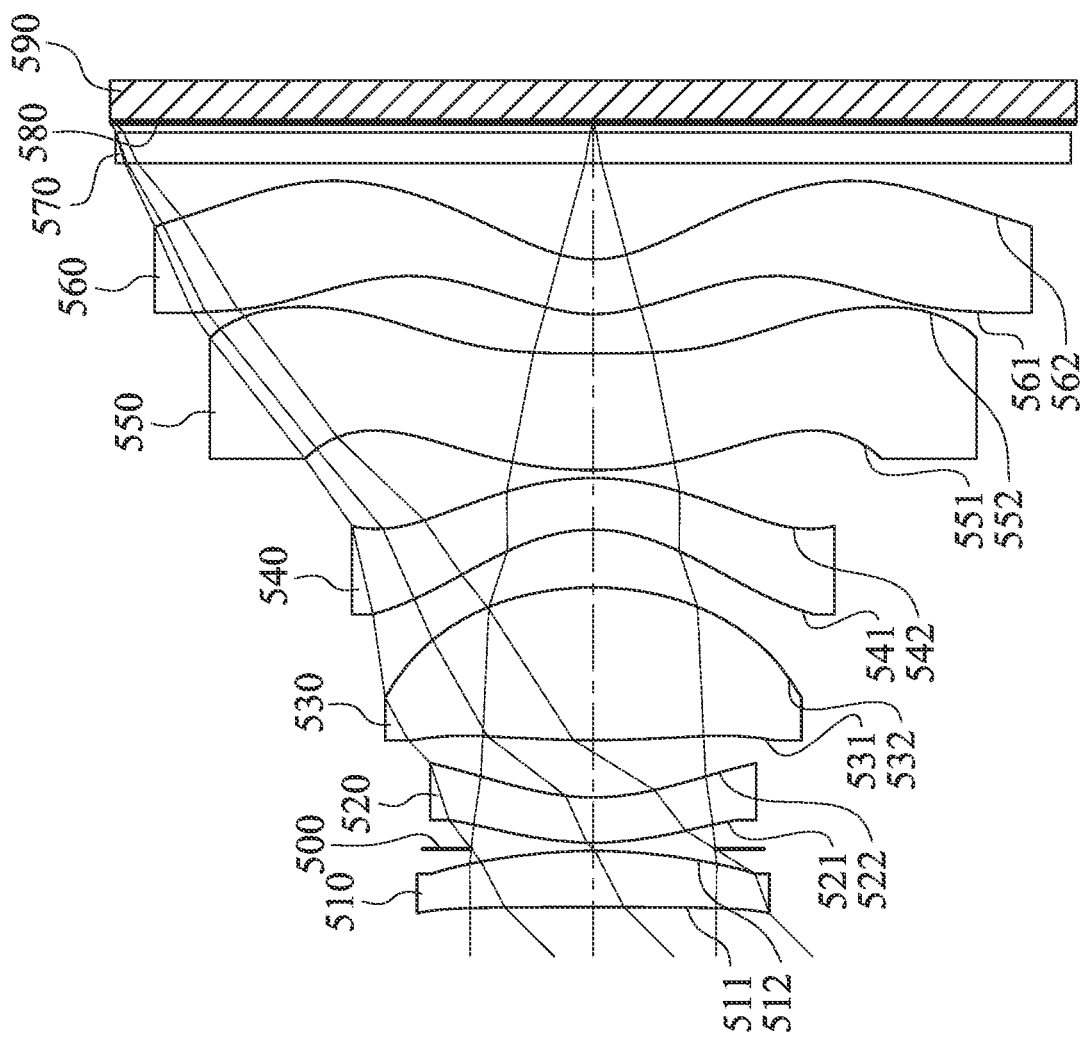
FIG. 9 is a schematic view of an image capturing apparatus according to the 5th embodiment of the present disclosure.
Figure 10:
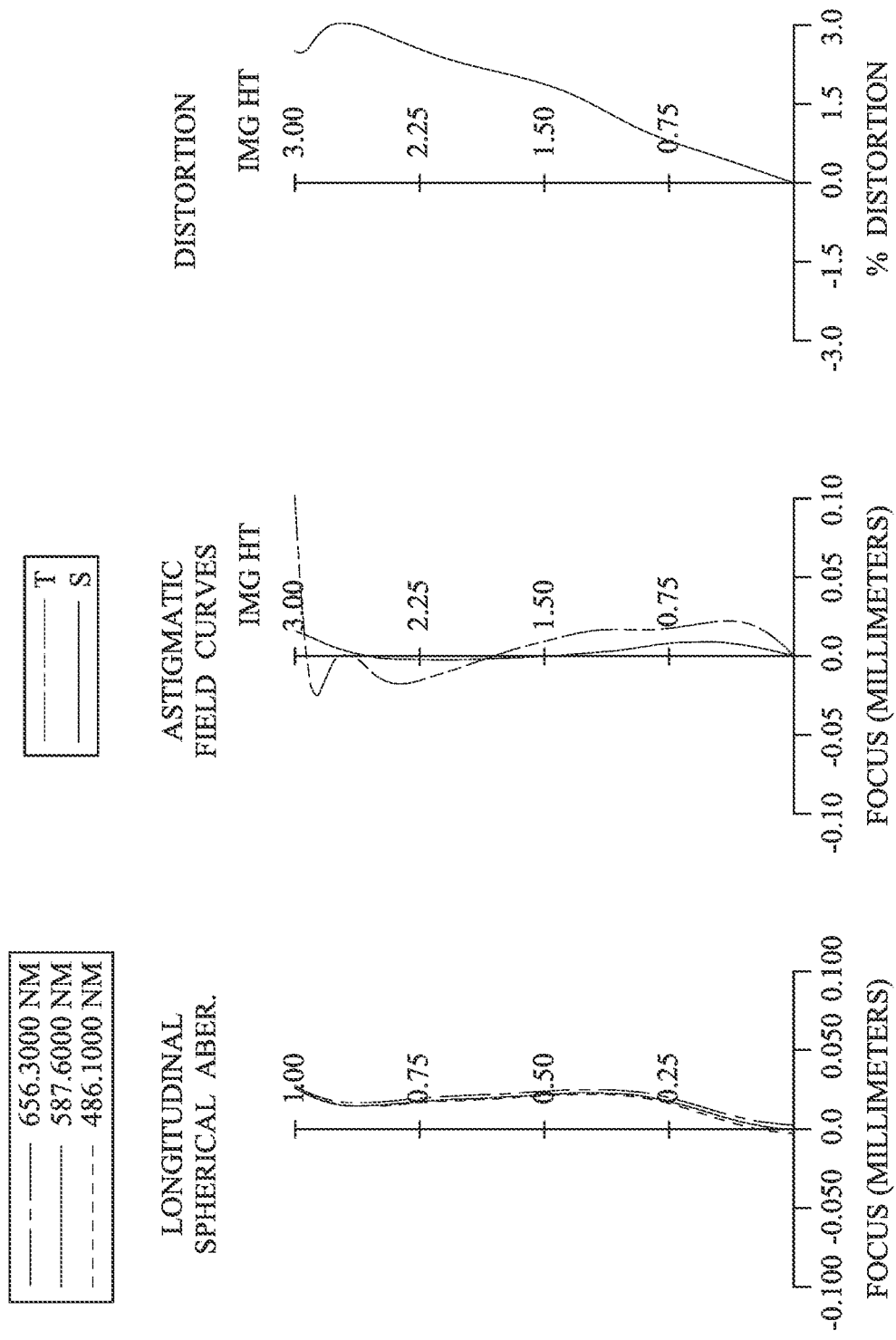
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes an optical photographing system (its reference numeral is omitted) and an image sensor 590. The optical photographing system includes, in order from an object side to an image side, a first lens element 510, an aperture stop 500, a second lens element 520, a third lens element 530, a fourth lens element 540, a fifth lens element 550, a sixth lens element 560, an IR-cut filter 570 and an image surface 580, wherein the image sensor 590 is disposed on the image surface 580 of the optical photographing system. The optical photographing system has a total of six lens elements (510-560).

The first lens element 510 with positive refractive power has an object-side surface 511 being concave in a paraxial region thereof and an image-side surface 512 being convex in a paraxial region thereof. The first lens element 510 is made of a plastic material, and has the object-side surface 511 and the image-side surface 512 being both aspheric.

The second lens element 520 with negative refractive power has an object-side surface 521 being convex in a paraxial region thereof and an image-side surface 522 being concave in a paraxial region thereof. The second lens element 520 is made of a plastic material, and has the object-side surface 521 and the image-side surface 522 being both aspheric.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric.

The fourth lens element 540 with negative refractive power has an object-side surface 541 being concave in a paraxial region thereof and an image-side surface 542 being convex in a paraxial region thereof. The fourth lens element 540 is made of a plastic material, and has the object-side surface 541 and the image-side surface 542 being both aspheric.

The fifth lens element 550 with positive refractive power has an object-side surface 551 being convex in a paraxial region thereof and an image-side surface 552 being concave in a paraxial region thereof. The fifth lens element 550 is made of a plastic material, and has the object-side surface 551 and the image-side surface 552 being both aspheric.

The sixth lens element 560 with negative refractive power has an object-side surface 561 being convex in a paraxial region thereof and an image-side surface 562 being concave in a paraxial region thereof. The sixth lens element 560 is made of a plastic material, and has the object-side surface 561 and the image-side surface 562 being both aspheric. Furthermore, the image-side surface 562 of the sixth lens element 560 includes at least one convex shape in an off-axial region thereof.

The IR-cut filter 570 is made of a glass material and located between the sixth lens element 560 and the image surface 580, and will not affect the focal length of the optical photographing system.

The detailed optical data of the 5th embodiment are shown in Table 9 and the aspheric surface data are shown in Table 10 below.

TABLE 9

5th Embodiment
f = 2.90 mm, Fno = 1.90, HFOV = 45.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −46.898 | ASP | 0.350 | Plastic | 1.544 | 56.0 | 6.47 |
| 2 | | −3.282 | ASP | 0.011 | | | | |
| 3 | Ape. Stop | Plano | | 0.039 | | | | |
| 4 | Lens 2 | 1.862 | ASP | 0.282 | Plastic | 1.671 | 19.5 | −13.64 |
| 5 | | 1.453 | ASP | 0.356 | | | | |
| 6 | Lens 3 | 6.777 | ASP | 0.950 | Plastic | 1.544 | 56.0 | 2.86 |
| 7 | | −1.924 | ASP | 0.359 | | | | |
| 8 | Lens 4 | −1.046 | ASP | 0.320 | Plastic | 1.660 | 20.4 | −4.69 |
| 9 | | −1.772 | ASP | 0.050 | | | | |
| 10 | Lens 5 | 2.816 | ASP | 0.726 | Plastic | 1.544 | 56.0 | 5.36 |
| 11 | | 72.667 | ASP | 0.244 | | | | |
| 12 | Lens 6 | 0.980 | ASP | 0.340 | Plastic | 1.544 | 56.0 | −7.52 |
| 13 | | 0.694 | ASP | 0.600 | | | | |
| 14 | IR-cut filter | Plano | | 0.190 | Glass | 1.517 | 64.2 | — |
| 15 | | Plano | | 0.063 | | | | |
| 16 | Image | Plano | | — | | | | |

Reference wavelength is 587.6 nm (d-line).

TABLE 10

Aspheric Coefficients

| Surface # | 1 | 2 | 4 | 5 | 6 | 7 |
|---|---|---|---|---|---|---|
| k = | −9.0000E+01 | −4.7698E+01 | −1.5733E+01 | −4.6972E+00 | −2.3485E+01 | −3.3369E+00 |
| A4 = | 2.4427E−02 | −1.3687E−01 | 8.5531E−02 | −8.8359E−02 | −5.0060E−02 | −1.4582E−01 |
| A6 = | −8.3444E−02 | 3.7052E−01 | −1.4160E−01 | 1.5908E−01 | 1.4680E−01 | 1.4598E−01 |
| A8 = | 1.4813E−01 | −6.7775E−01 | 1.1232E−01 | −2.3114E−01 | −5.3347E−01 | −1.1278E−01 |
| A10 = | −1.8325E−01 | 6.7259E−01 | −8.6892E−02 | 1.6819E−01 | 9.7924E−01 | −9.6650E−02 |
| A12 = | 1.1016E−01 | −3.5415E−01 | 5.9680E−03 | −7.3006E−02 | −1.0479E+00 | 2.1298E−01 |
| A14 = | −2.7155E−02 | 7.5709E−02 | 3.3332E−03 | 1.6587E−02 | 5.7871E−01 | −1.3309E−01 |
| A16 = | | | | | −1.2369E−01 | 2.8634E−02 |

| Surface # | 8 | 9 | 10 | 11 | 12 | 13 |
|---|---|---|---|---|---|---|
| k = | −1.3355E+00 | −2.5350E+00 | 8.6527E−01 | −9.0000E+01 | −3.8848E+00 | −2.7738E+00 |
| A4 = | −2.0585E−01 | −1.6625E−01 | 7.6264E−02 | 2.3216E−01 | −1.3780E−01 | −1.3285E−01 |
| A6 = | 1.0868E+00 | 5.2965E−01 | −1.3789E−01 | −1.6637E−01 | 2.5192E−02 | 5.9067E−02 |
| A8 = | −1.9064E+00 | −7.1272E−01 | 9.1960E−02 | 5.8381E−02 | 1.7859E−03 | −1.9046E−02 |
| A10 = | 1.8494E+00 | 5.4080E−01 | −5.1399E−02 | −1.1989E−02 | −1.2521E−03 | 3.8506E−03 |
| A12 = | −1.0179E+00 | −2.2747E−01 | 1.9081E−02 | 1.4039E−03 | 1.8961E−04 | −4.6059E−04 |
| A14 = | 2.9881E−01 | 4.9926E−02 | −3.8990E−03 | −8.1358E−05 | −1.2311E−05 | 3.0449E−05 |
| A16 = | −3.6559E−02 | −4.4908E−03 | 3.2410E−04 | 1.4264E−06 | 2.4473E−07 | −8.7234E−07 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.90 | |f3/f2| | 0.21 |
| Fno | 1.90 | |f5/f6| | 0.71 |
| HFOV [deg.] | 45.1 | (|P1| + |P2|)/(|P3| + |P4|) | 0.41 |
| (V2 + V4)/V3 | 0.71 | Y31/Y11 | 1.05 |
| T45/T34 | 0.14 | Y31/Y21 | 1.28 |
| CT3/CT2 | 3.37 | SD/TD | 0.91 |
| (CT1 + CT2 + CT4)/(CT3 + CT5) | 0.57 | R2/ImgH | −1.09 |
| R7/f | −0.36 | R7/ImgH | −0.35 |
| |R2/R1| | 0.07 | ImgH/f | 1.03 |
| (R3 − R4)/(R3 + R4) | 0.12 | f/TL | 0.59 |
| (R6 − R7)/(R6 + R7) | 0.30 | TL [mm] | 4.88 |
| (R7 − R8)/(R7 + R8) | −0.26 | f/EPD | 1.90 |
| (R9 + R10)/(R9 + R10) | −1.08 | f/tan(HFOV) [mm] | 2.89 |
| (R11 − R12)/(R11 + R12) | 0.17 | tan(HFOV) | 1.00 |
| |f3/f1| | 0.44 | |SAG11/Y11| | 0.04 |

6th Embodiment

Figure 11:
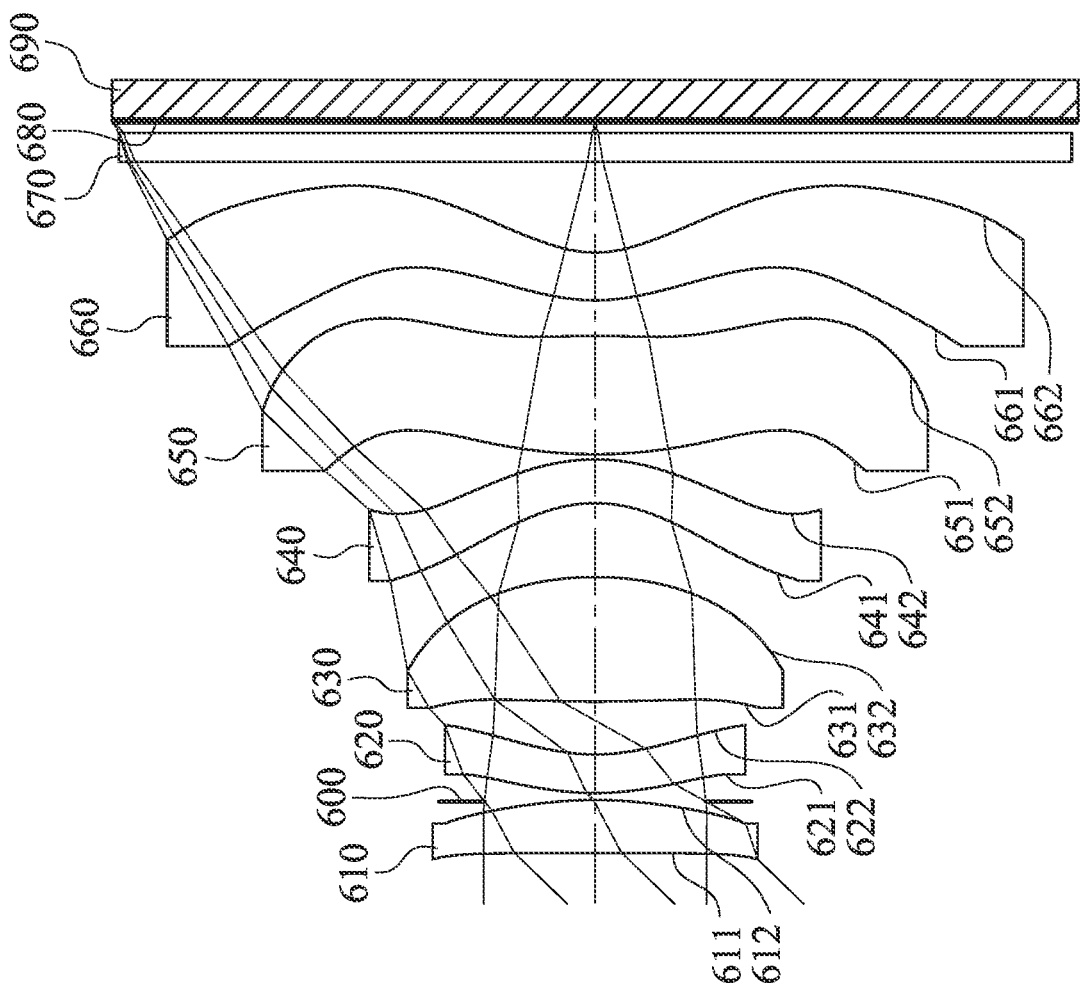
FIG. 11 is a schematic view of an image capturing apparatus according to the 6th embodiment of the present disclosure.
Figure 12:
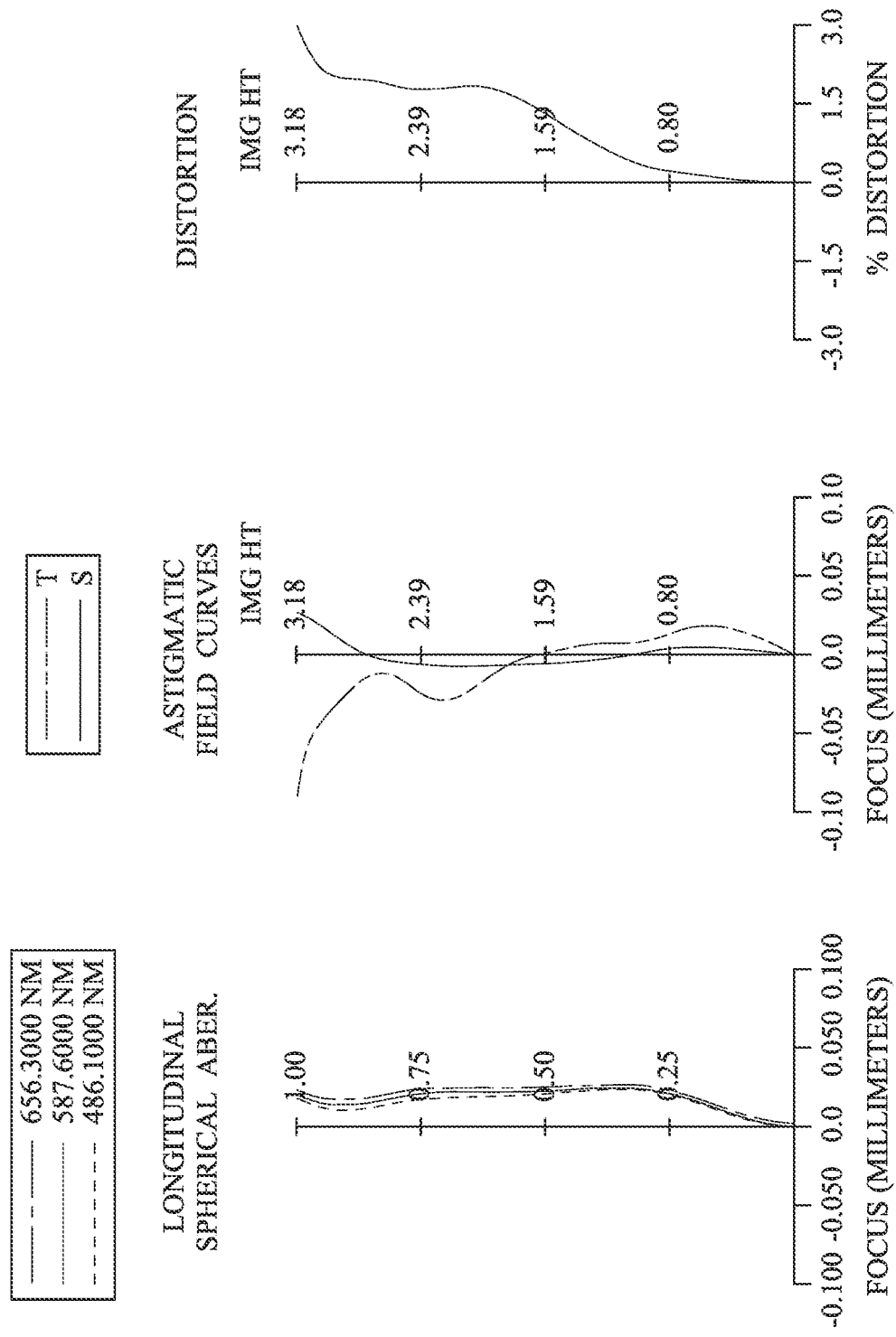
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes an optical photographing system (its reference numeral is omitted) and an image sensor 690. The optical photographing system includes, in order from an object side to an image side, a first lens element 610, an aperture stop 600, a second lens element 620, a third lens element 630, a fourth lens element 640, a fifth lens element 650, a sixth lens element 660, an IR-cut filter 670 and an image surface 680, wherein the image sensor 690 is disposed on the image surface 680 of the optical photographing system. The optical photographing system has a total of six lens elements (610-660).

The first lens element 610 with positive refractive power has an object-side surface 611 being concave in a paraxial region thereof and an image-side surface 612 being convex in a paraxial region thereof. The first lens element 610 is made of a plastic material, and has the object-side surface 611 and the image-side surface 612 being both aspheric.

The second lens element 620 with negative refractive power has an object-side surface 621 being convex in a paraxial region thereof and an image-side surface 622 being concave in a paraxial region thereof. The second lens element 620 is made of a plastic material, and has the object-side surface 621 and the image-side surface 622 being both aspheric.

The third lens element 630 with positive refractive power has an object-side surface 631 being convex in a paraxial region thereof and an image-side surface 632 being convex in a paraxial region thereof. The third lens element 630 is made of a plastic material, and has the object-side surface 631 and the image-side surface 632 being both aspheric.

The fourth lens element 640 with negative refractive power has an object-side surface 641 being concave in a paraxial region thereof and an image-side surface 642 being convex in a paraxial region thereof. The fourth lens element 640 is made of a plastic material, and has the object-side surface 641 and the image-side surface 642 being both aspheric.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric.

The sixth lens element 660 with negative refractive power has an object-side surface 661 being convex in a paraxial region thereof and an image-side surface 662 being concave in a paraxial region thereof. The sixth lens element 660 is made of a plastic material, and has the object-side surface 661 and the image-side surface 662 being both aspheric. Furthermore, the image-side surface 662 of the sixth lens element 660 includes at least one convex shape in an off-axial region thereof.

The IR-cut filter 670 is made of a glass material and located between the sixth lens element 660 and the image surface 680, and will not affect the focal length of the optical photographing system.

The detailed optical data of the 6th embodiment are shown in Table 11 and the aspheric surface data are shown in Table 12 below.

TABLE 11

6th Embodiment
f = 2.95 mm, Fno = 2.01, HFOV = 46.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −48.095 | ASP | 0.349 | Plastic | 1.544 | 55.9 | 5.21 |
| 2 | | −2.681 | ASP | −0.010 | | | | |
| 3 | Ape. Stop | Plano | | 0.055 | | | | |
| 4 | Lens 2 | 1.878 | ASP | 0.256 | Plastic | 1.660 | 20.4 | −8.96 |
| 5 | | 1.348 | ASP | 0.349 | | | | |
| 6 | Lens 3 | 9.247 | ASP | 0.823 | Plastic | 1.544 | 55.9 | 3.17 |
| 7 | | −2.054 | ASP | 0.487 | | | | |
| 8 | Lens 4 | −0.987 | ASP | 0.289 | Plastic | 1.660 | 20.4 | −6.97 |
| 9 | | −1.403 | ASP | 0.035 | | | | |
| 10 | Lens 5 | 3.905 | ASP | 0.782 | Plastic | 1.544 | 55.9 | 4.22 |
| 11 | | −5.176 | ASP | 0.234 | | | | |
| 12 | Lens 6 | 1.286 | ASP | 0.316 | Plastic | 1.660 | 20.4 | −3.81 |
| 13 | | 0.768 | ASP | 0.600 | | | | |
| 14 | IR-cut filter | Plano | | 0.190 | Glass | 1.517 | 64.2 | — |
| 15 | | Plano | | 0.077 | | | | |
| 16 | Image | Plano | | — | | | | |

Reference wavelength is 587.6 nm (d-line).

TABLE 12

Aspheric Coefficients

| Surface # | 1 | 2 | 4 | 5 | 6 | 7 |
|---|---|---|---|---|---|---|
| k = | 9.0000E+01 | −5.0250E+01 | −1.7066E+01 | −5.2507E+00 | −7.0893E+01 | −3.5216E+00 |
| A4 = | 2.5908E−02 | −1.7061E−01 | 1.1259E−01 | −1.1722E−01 | −5.5670E−02 | −1.1111E−01 |
| A6 = | −9.3138E−02 | 5.1418E−01 | −2.9362E−01 | 2.7563E−01 | 1.3947E−01 | 4.9309E−02 |
| A8 = | 1.7446E−01 | −1.0425E+00 | 4.6667E−01 | −5.5868E−01 | −5.9581E−01 | −1.6368E−03 |
| A10 = | −2.3441E−01 | 1.1612E+00 | −6.5150E−01 | 6.1177E−01 | 1.2523E+00 | −1.8071E−01 |

TABLE 12-continued

| | | | | | | |
|---|---|---|---|---|---|---|
| A12 = | 1.5256E−01 | −6.8990E−01 | 5.0136E−01 | −3.9111E−01 | −1.5382E+00 | 2.6712E−01 |
| A14 = | −4.1626E−02 | 1.6668E−01 | −1.8791E−01 | 1.1293E−01 | 9.5605E−01 | −1.6684E−01 |
| A16 = | | | | | −2.2538E−01 | 3.8323E−02 |

| Surface # | 8 | 9 | 10 | 11 | 12 | 13 |
|---|---|---|---|---|---|---|
| k = | −1.3755E+00 | −2.6170E+00 | 1.9571E+00 | 4.4502E+00 | −6.4935E+00 | −3.7719E+00 |
| A4 = | −1.6448E−01 | −1.5982E−01 | 1.0501E−01 | 3.8399E−01 | −3.5257E−02 | −5.9674E−02 |
| A6 = | 9.8331E−01 | 4.8723E−01 | −1.7465E−01 | −3.4344E−01 | −1.5959E−02 | 6.9785E−03 |
| A8 = | −1.7267E+00 | −6.0525E−01 | 1.0872E−01 | 1.7244E−01 | −2.1992E−03 | −2.2443E−04 |
| A10 = | 1.6757E+00 | 4.1663E−01 | −5.0688E−02 | −5.5839E−02 | 4.5341E−03 | 2.3248E−05 |
| A12 = | −9.2338E−01 | −1.5020E−01 | 1.5966E−02 | 1.1245E−02 | −1.2460E−03 | −4.2968E−09 |
| A14 = | 2.7258E−01 | 2.5625E−02 | −2.9844E−03 | −1.2679E−03 | 1.3857E−04 | −1.2619E−06 |
| A16 = | −3.3935E−02 | −1.4907E−03 | 2.4953E−04 | 6.0681E−05 | −5.6616E−06 | 1.0046E−07 |

In the 6th embodiment, the equation of the aspheric surface profiles of the aforementioned lens elements is the same as the equation of the 1 st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 2.95 | |f3/f2| | 0.35 |
| Fno | 2.01 | |f5/f6| | 1.11 |
| HFOV [deg.] | 46.2 | (|P1| + |P2|)/(|P3| + |P4|) | 0.66 |
| (V2 + V4)/V3 | 0.73 | Y31/Y11 | 1.02 |
| T45/T34 | 0.07 | Y31/Y21 | 1.26 |
| CT3/CT2 | 3.21 | SD/TD | 0.91 |
| (CT1 + CT2 + CT4)/(CT3 + CT5) | 0.56 | R2/ImgH | −0.84 |
| R7/f | −0.33 | R7/ImgH | −0.31 |
| |R2/R1| | 0.06 | ImgH/f | 1.08 |
| (R3 − R4)/(R3 + R4) | 0.16 | f/TL | 0.61 |
| (R6 − R7)(R6 + R7) | 0.35 | TL [mm] | 4.83 |
| (R7 − R8)/(R7 + R8) | −0.17 | f/EPD | 2.01 |
| (R9 + R10)/(R9 − R10) | −0.14 | f/tan(HFOV) [mm] | 2.83 |
| (R11 − R12)/(R11 + R12) | 0.25 | tan(HFOV) | 1.04 |
| |f3/f1| | 0.61 | |SAG11/Y11| | 0.04 |

7th Embodiment

Figure 13:
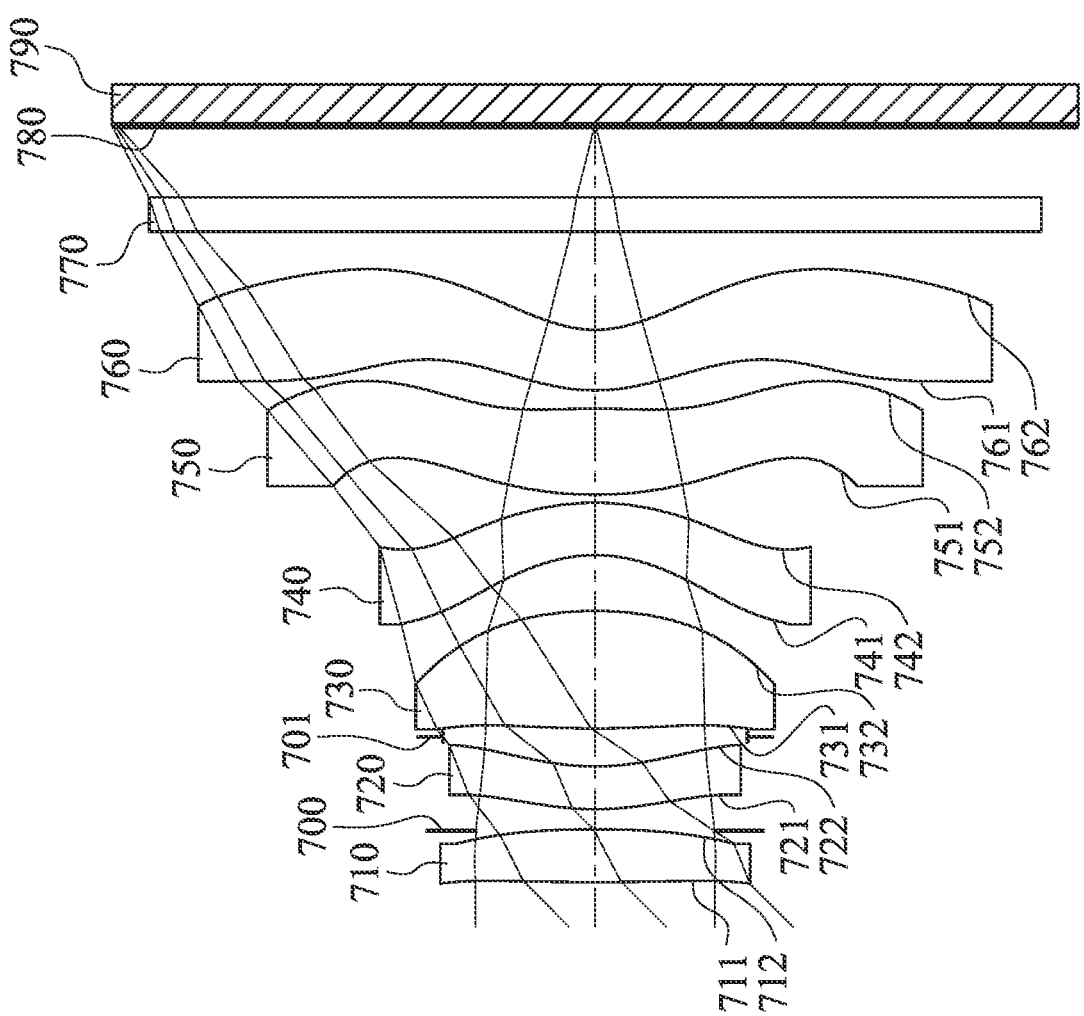
FIG. 13 is a schematic view of an image capturing apparatus according to the 7th embodiment of the present disclosure.
Figure 14:
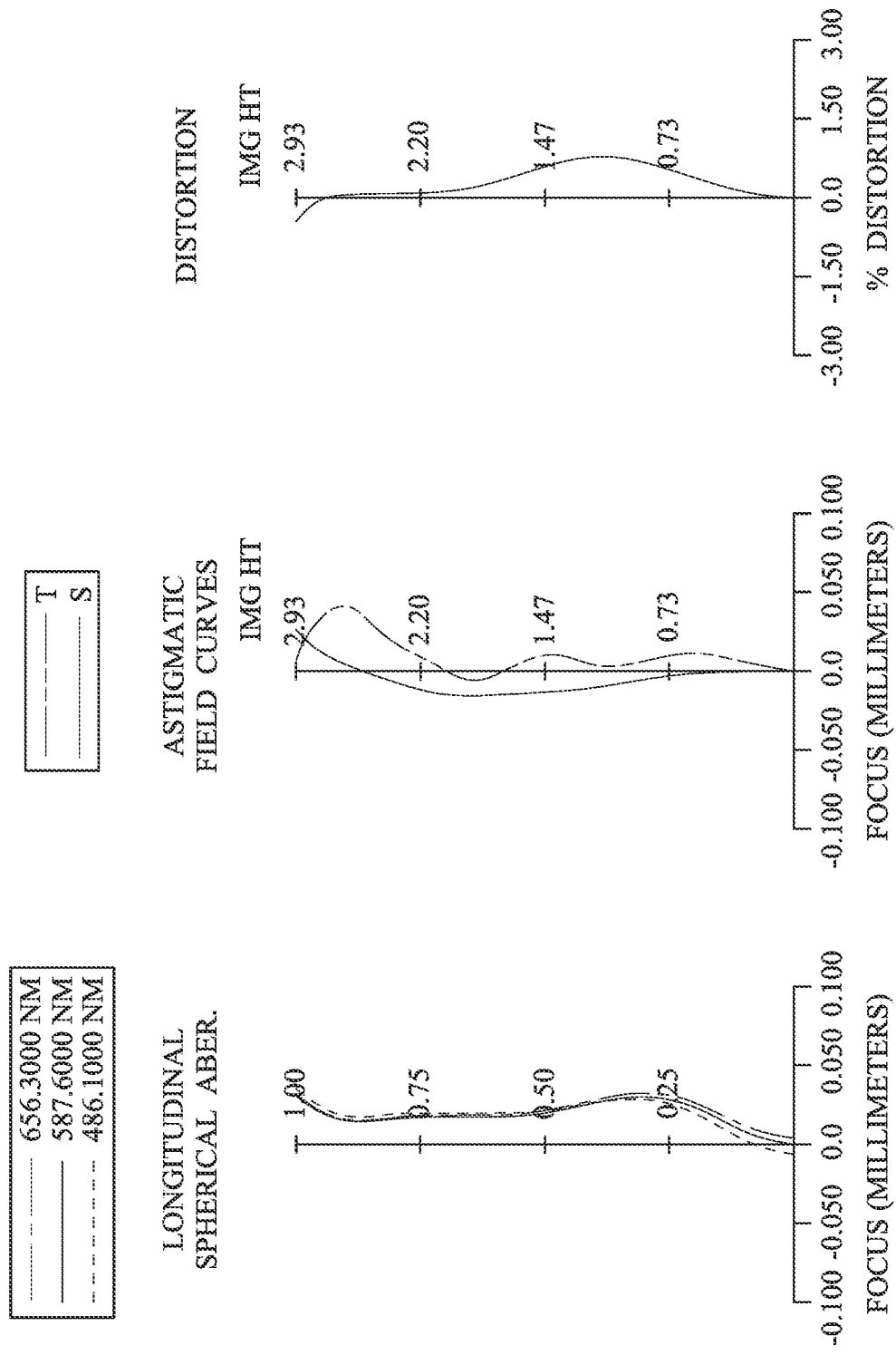
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes an optical photographing system (its reference numeral is omitted) and an image sensor 790. The optical photographing system includes, in order from an object side to an image side, a first lens element 710, an aperture stop 700, a second lens element 720, a stop 701, a third lens element 730, a fourth lens element 740, a fifth lens element 750, a sixth lens element 760, an IR-cut filter 770 and an image surface 780, wherein the image sensor 790 is disposed on the image surface 780 of the optical photographing system. The optical photographing system has a total of six lens elements (710-760).

The first lens element 710 with positive refractive power has an object-side surface 711 being convex in a paraxial region thereof and an image-side surface 712 being convex in a paraxial region thereof. The first lens element 710 is made of a plastic material, and has the object-side surface 711 and the image-side surface 712 being both aspheric.

The second lens element 720 with negative refractive power has an object-side surface 721 being convex in a paraxial region thereof and an image-side surface 722 being concave in a paraxial region thereof. The second lens element 720 is made of a plastic material, and has the object-side surface 721 and the image-side surface 722 being both aspheric.

The third lens element 730 with positive refractive power has an object-side surface 731 being convex in a paraxial region thereof and an image-side surface 732 being convex in a paraxial region thereof. The third lens element 730 is made of a plastic material, and has the object-side surface 731 and the image-side surface 732 being both aspheric.

The fourth lens element 740 with negative refractive power has an object-side surface 741 being concave in a paraxial region thereof and an image-side surface 742 being convex in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric.

The sixth lens element 760 with negative refractive power has an object-side surface 761 being convex in a paraxial region thereof and an image-side surface 762 being concave in a paraxial region thereof. The sixth lens element 760 is made of a plastic material, and has the object-side surface 761 and the image-side surface 762 being both aspheric. Furthermore, the image-side surface 762 of the sixth lens element 760 includes at least one convex shape in an off-axial region thereof.

The IR-cut filter 770 is made of a glass material and located between the sixth lens element 760 and the image surface 780, and will not affect the focal length of the optical photographing system.

The detailed optical data of the 7th embodiment are shown in Table 13 and the aspheric surface data are shown in Table 14 below.

TABLE 13

7th Embodiment
f = 2.94 mm, Fno = 2.01, HFOV = 44.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 15.743 | ASP | 0.323 | Plastic | 1.544 | 55.9 | 9.59 |
| 2 | | −7.739 | ASP | −0.009 | | | | |
| 3 | Ape. Stop | Plano | | 0.132 | | | | |
| 4 | Lens 2 | 1.693 | ASP | 0.261 | Plastic | 1.660 | 20.4 | −31.79 |
| 5 | | 1.470 | ASP | 0.181 | | | | |
| 6 | Stop | Plano | | 0.052 | | | | |
| 7 | Lens 3 | 6.099 | ASP | 0.720 | Plastic | 1.544 | 55.9 | 2.97 |
| 8 | | −2.104 | ASP | 0.340 | | | | |
| 9 | Lens 4 | −0.959 | ASP | 0.320 | Plastic | 1.660 | 20.4 | −3.85 |
| 10 | | −1.744 | ASP | 0.050 | | | | |
| 11 | Lens 5 | 2.620 | ASP | 0.527 | Plastic | 1.544 | 55.9 | 3.01 |
| 12 | | −4.057 | ASP | 0.111 | | | | |
| 13 | Lens 6 | 1.159 | ASP | 0.370 | Plastic | 1.544 | 55.9 | −4.58 |
| 14 | | 0.702 | ASP | 0.600 | | | | |
| 15 | IR-cut filter | Plano | | 0.210 | Glass | 1.517 | 64.2 | — |
| 16 | | Plano | | 0.438 | | | | |
| 17 | Image | Plano | | — | | | | |

Reference wavelength is 587.6 nm (d-line).
Effective radius of Stop on Surface 6 is 0.930 mm.

TABLE 14

Aspheric Coefficients

| Surface # | 1 | 2 | 4 | 5 | 7 | 8 |
|---|---|---|---|---|---|---|
| k = | 2.0760E+01 | −1.2693E+01 | −2.5872E+01 | −6.3648E+00 | −9.0000E+01 | −1.9967E+00 |
| A4 = | −4.1436E−02 | −2.3352E−01 | 1.5931E−01 | −1.1774E−01 | −3.1160E−02 | −1.2317E−01 |
| A6 = | 6.5771E−02 | 6.3312E−01 | −1.0007E+00 | 8.5513E−02 | 6.8716E−02 | 4.8205E−02 |
| A8 = | −2.3032E−01 | −1.1293E+00 | 3.0231E+00 | 4.8272E−03 | −7.0323E−01 | −1.3099E−01 |
| A10 = | 4.0253E−01 | 1.1088E+00 | −5.7181E+00 | −3.6200E−01 | 1.9578E+00 | 1.6307E−03 |
| A12 = | −3.9406E−01 | −6.2914E−01 | 5.7296E+00 | 4.3471E−01 | −3.0766E+00 | 2.8862E−01 |
| A14 = | 1.4390E−01 | 1.7231E−01 | −2.4774E+00 | −1.6472E−01 | 2.4878E+00 | −3.1955E−01 |
| A16 = | | | | | −7.6749E−01 | 1.0858E−01 |

| Surface # | 9 | 10 | 11 | 12 | 13 | 14 |
|---|---|---|---|---|---|---|
| k = | −1.4583E+00 | −2.0303E+00 | −5.6672E−01 | −1.8519E+00 | −3.0377E+00 | −3.1376E+00 |
| A4 = | −1.9987E−02 | −1.5176E−01 | 1.0873E−01 | 6.0108E−01 | −1.5506E−01 | −1.3947E−01 |
| A6 = | 4.2196E−01 | 3.6434E−01 | −1.3459E−01 | −6.2028E−01 | −2.2020E−02 | 3.5917E−02 |
| A8 = | −1.1488E+00 | −5.8394E−01 | 7.0373E−03 | 3.4230E−01 | 4.5007E−02 | −1.6589E−03 |
| A10 = | 1.9259E+00 | 7.0184E−01 | 3.5036E−02 | −1.1689E−01 | −1.5852E−02 | −1.3834E−03 |
| A12 = | −1.6876E+00 | −4.5169E−01 | −1.8925E−02 | 2.4275E−02 | 2.6670E−03 | 3.8293E−04 |
| A14 = | 7.3688E−01 | 1.4294E−01 | 3.6745E−03 | −2.7848E−03 | −2.2793E−04 | −4.2602E−05 |
| A16 = | −1.2956E−01 | −1.7811E−02 | −2.0879E−04 | 1.3433E−04 | 8.0061E−06 | 1.7773E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 2.94 | |f3/f2| | 0.09 |
| Fno | 2.01 | |f5/f6| | 0.66 |
| HFOV [deg.] | 44.9 | (|P1| + |P2|)/ (|P3| + |P4|) | 0.23 |
| (V2 + V4)/V3 | 0.73 | Y31/Y11 | 1.02 |
| T45/T34 | 0.15 | Y31/Y21 | 1.25 |
| CT3/CT2 | 2.76 | SD/TD | 0.91 |
| (CT1 + CT2 + CT4)/ (CT3 + CT5) | 0.72 | R2/ImgH | −2.64 |
| R7/f | −0.33 | R7/ImgH | −0.33 |
| |R2/R1| | 0.49 | ImgH/f | 1.00 |
| (R3 − R4)/(R3 + R4) | 0.07 | f/TL | 0.64 |
| (R6 − R7)(R6 + R7) | 0.37 | TL [mm] | 4.63 |
| (R7 − R8)/(R7 + R8) | −0.29 | f/EPD | 2.01 |
| (R9 + R10)/(R9 − R10) | −0.22 | f/tan(HFOV) [mm] | 2.95 |
| (R11 − R12)/(R11 + R12) | 0.25 | tan(HFOV) | 1.00 |
| |f3/f1| | 0.31 | |SAG11/Y11| | 0.01 |

8th Embodiment

Figure 15:
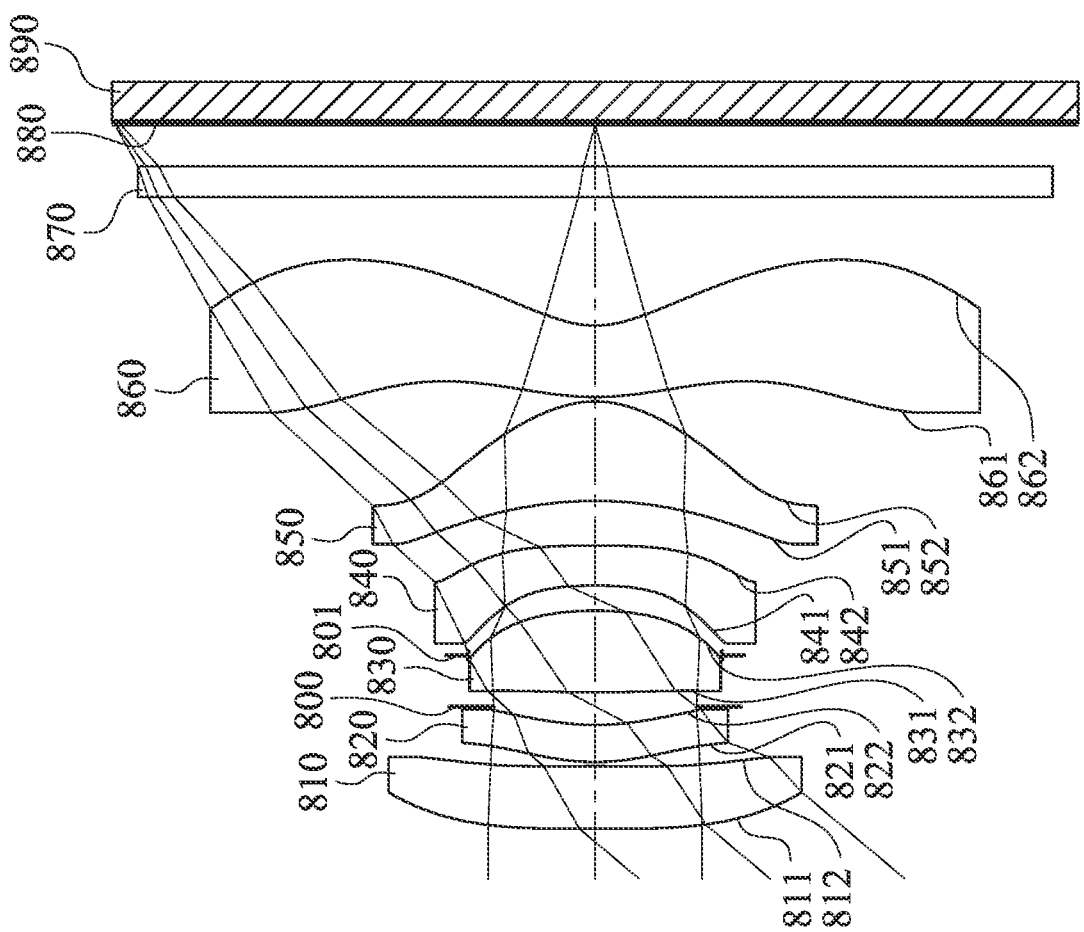
FIG. 15 is a schematic view of an image capturing apparatus according to the 8th embodiment of the present disclosure.
Figure 16:
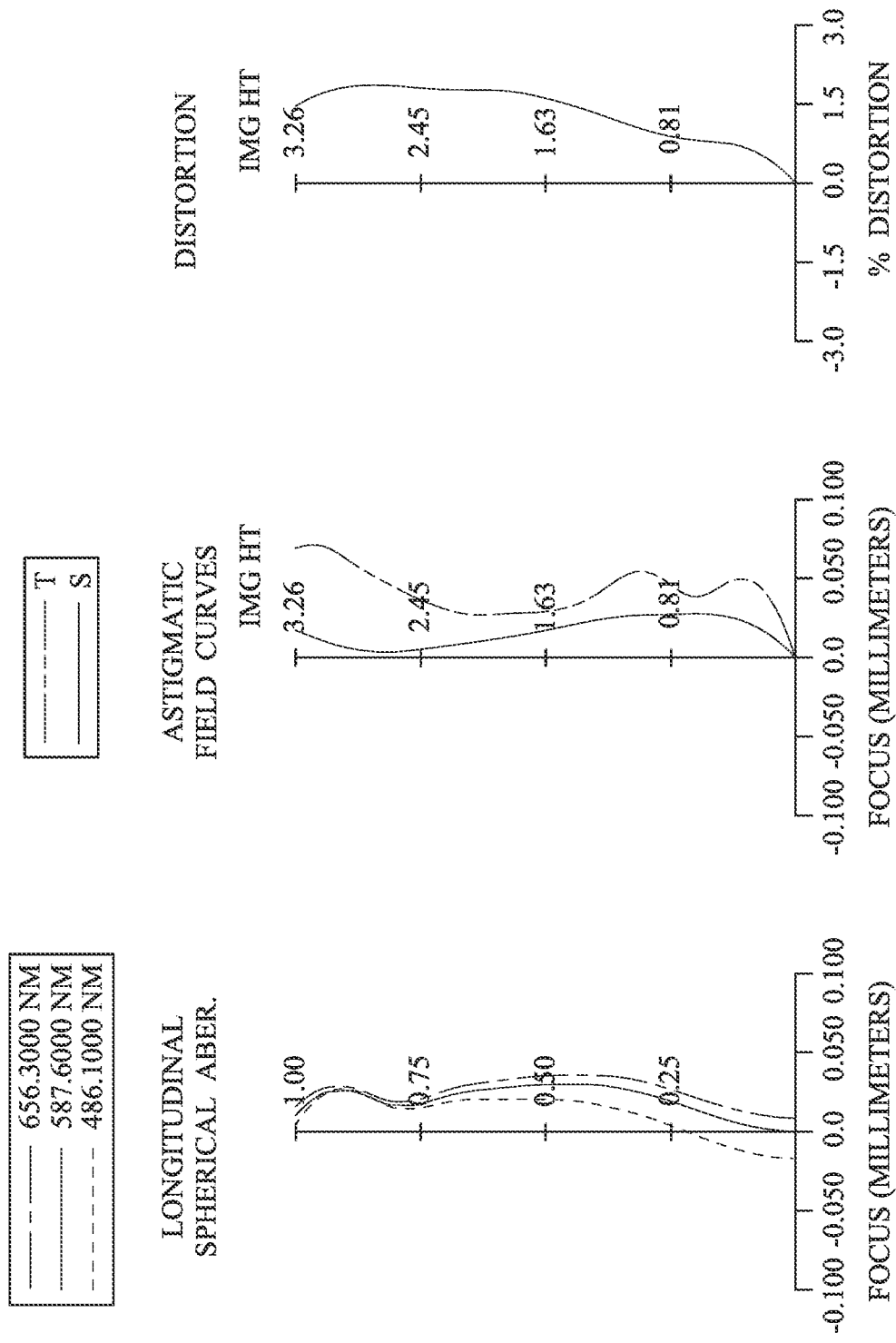
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes an optical photographing system (its reference numeral is omitted) and an image sensor 890. The optical photographing system includes, in order from an object side to an image side, a first lens element 810, a second lens element 820, an aperture stop 800, a third lens element 830, a stop 801, a fourth lens element 840, a fifth lens element 850, a sixth lens element 860, an IR-cut filter 870 and an image surface 880, wherein the image sensor 890 is disposed on the image surface 880 of the optical photographing system. The optical photographing system has a total of six lens elements (810-860).

The first lens element 810 with positive refractive power has an object-side surface 811 being convex in a paraxial region thereof and an image-side surface 812 being convex in a paraxial region thereof. The first lens element 810 is made of a plastic material, and has the object-side surface 811 and the image-side surface 812 being both aspheric.

The second lens element 820 with positive refractive power has an object-side surface 821 being convex in a paraxial region thereof and an image-side surface 822 being concave in a paraxial region thereof. The second lens element 820 is made of a plastic material, and has the object-side surface 821 and the image-side surface 822 being both aspheric.

The third lens element 830 with positive refractive power has an object-side surface 831 being convex in a paraxial region thereof and an image-side surface 832 being convex in a paraxial region thereof. The third lens element 830 is made of a plastic material, and has the object-side surface 831 and the image-side surface 832 being both aspheric.

The fourth lens element 840 with negative refractive power has an object-side surface 841 being concave in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being concave in a paraxial region thereof and an image-side surface 852 being convex in a paraxial region thereof. The fifth lens element 850 is made of a plastic material, and has the object-side surface 851 and the image-side surface 852 being both aspheric.

The sixth lens element 860 with negative refractive power has an object-side surface 861 being convex in a paraxial region thereof and an image-side surface 862 being concave in a paraxial region thereof. The sixth lens element 860 is made of a plastic material, and has the object-side surface 861 and the image-side surface 862 being both aspheric. Furthermore, the image-side surface 862 of the sixth lens element 860 includes at least one convex shape in an off-axial region thereof.

The IR-cut filter 870 is made of a glass material and located between the sixth lens element 860 and the image surface 880, and will not affect the focal length of the optical photographing system.

The detailed optical data of the 8th embodiment are shown in Table 15 and the aspheric surface data are shown in Table 16 below.

TABLE 15

8th Embodiment
f = 2.69 mm, Fno = 1.85, HFOV = 50.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 200.000 | ASP | 0.424 | Plastic | 1.545 | 56.0 | 41.00 |
| 2 | | −25.114 | ASP | 0.030 | | | | |
| 3 | Lens 2 | 1.597 | ASP | 0.250 | Plastic | 1.639 | 23.5 | 20.57 |
| 4 | | 1.707 | ASP | 0.126 | | | | |
| 5 | Ape. Stop | Plano | | 0.096 | | | | |
| 6 | Lens 3 | 9.884 | ASP | 0.555 | Plastic | 1.544 | 55.9 | 3.46 |
| 7 | | −2.275 | ASP | −0.304 | | | | |
| 8 | Stop | Plano | | 0.475 | | | | |
| 9 | Lens 4 | −2.860 | ASP | 0.270 | Plastic | 1.660 | 20.4 | −4.84 |
| 10 | | −28.374 | ASP | 0.305 | | | | |
| 11 | Lens 5 | −2.553 | ASP | 0.675 | Plastic | 1.544 | 55.9 | 1.58 |
| 12 | | −0.702 | ASP | 0.030 | | | | |
| 13 | Lens 6 | 1.945 | ASP | 0.484 | Plastic | 1.544 | 55.9 | −2.00 |
| 14 | | 0.636 | ASP | 0.874 | | | | |
| 15 | IR-cut filter | Plano | | 0.210 | Glass | 1.517 | 64.2 | — |
| 16 | | Plano | | 0.293 | | | | |
| 17 | Image | Plano | | — | | | | |

Reference wavelength is 587.6 nm (d-line).

Effective radius of Stop on Surface 8 is 0.860 mm.

TABLE 16

Aspheric Coefficients

| Surface # | 1 | 2 | 3 | 4 | 6 | 7 |
|---|---|---|---|---|---|---|
| k = | −9.0000E+01 | 8.5019E+01 | −2.8204E+00 | −9.8468E+00 | 5.3933E+01 | 2.3662E+00 |
| A4 = | 1.0451E−01 | 1.1891E−01 | −1.0826E−01 | −1.6082E−02 | −5.0105E−02 | −2.2565E−01 |
| A6 = | −5.1979E−02 | −7.7672E−02 | −5.5452E−02 | 1.1325E−01 | 2.4060E−01 | −4.8752E−01 |
| A8 = | 2.9485E−02 | 3.2675E−02 | 1.2091E−01 | −1.8525E+00 | −2.4516E+00 | 4.0769E+00 |
| A10 = | −7.8213E−03 | −2.3387E−02 | −8.6935E−01 | 6.6240E+00 | 1.0346E+01 | −1.5658E+01 |
| A12 = | 7.1094E−05 | 1.3928E−02 | 1.4550E+00 | −1.1529E+01 | −2.2846E+01 | 3.1554E+01 |
| A14 = | 1.6660E−04 | −3.0511E−03 | −6.7667E−01 | 9.1114E+00 | 2.3927E+01 | −3.3024E+01 |
| A16 = |  |  |  |  | −8.8570E+00 | 1.3936E+01 |

| Surface # | 9 | 10 | 11 | 12 | 13 | 14 |
|---|---|---|---|---|---|---|
| k = | 8.7996E+00 | 9.0000E+01 | −5.1238E+00 | −4.1339E+00 | −7.6767E−01 | −4.4100E+00 |
| A4 = | −6.4638E−01 | −4.1353E−01 | 3.9800E−02 | −3.9836E−01 | −1.1750E−01 | −7.6718E−02 |
| A6 = | 6.2025E−01 | 3.8798E−01 | −2.4143E−01 | 6.7376E−01 | 4.1003E−02 | 3.0062E−02 |
| A8 = | −1.1422E+00 | −1.7661E−01 | 4.0000E−01 | −9.4006E−01 | −1.3285E−02 | −9.8481E−03 |
| A10 = | 2.8611E+00 | −1.2310E−01 | −2.9144E−01 | 8.5471E−01 | 3.9961E−03 | 2.1527E−03 |
| A12 = | −4.3173E+00 | 2.0420E−01 | 7.8185E−02 | −4.1395E−01 | −7.3928E−04 | −2.9146E−04 |
| A14 = | 2.6876E+00 | −1.4181E−01 | 6.8680E−03 | 9.8627E−02 | 7.0060E−05 | 2.1698E−05 |
| A16 = | 1.4869E−01 | 6.2949E−02 | −4.5421E−03 | −9.1234E−03 | −2.6280E−06 | −6.6509E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 2.69 | |f3/f2| | 0.17 |
| Fno | 1.85 | |f5/f6| | 0.79 |
| HFOV [deg.] | 50.0 | (|P1| + |P2|)/(|P3| + |P4|) | 0.15 |
| (V2 + V4)/V3 | 0.79 | Y31/Y11 | 0.52 |
| T45/T34 | 1.75 | Y31/Y21 | 0.81 |
| CT3/CT2 | 2.22 | SD/TD | 0.76 |
| (CT1 + CT2 + CT4)/(CT3 + CT5) | 0.77 | R2/ImgH | −7.70 |
| R7/f | −1.06 | R7/ImgH | −0.88 |
| |R2/R1| | 0.13 | ImgH/f | 1.21 |
| (R3 − R4)/(R3 + R4) | −0.03 | f/TL | 0.56 |
| (R6 − R7)(R6 + R7) | −0.11 | TL [mm] | 4.79 |
| (R7 − R8)/(R7 + R8) | −0.82 | f/EPD | 1.85 |
| (R9 + R10)/(R9 − R10) | 1.76 | f/tan(HFOV) [mm] | 2.26 |
| (R11 − R12)/(R11 + R12) | 0.51 | tan(HFOV) | 1.19 |
| |f3/f1| | 0.08 | |SAG11/Y11| | 0.18 |

9th Embodiment

Figure 17:
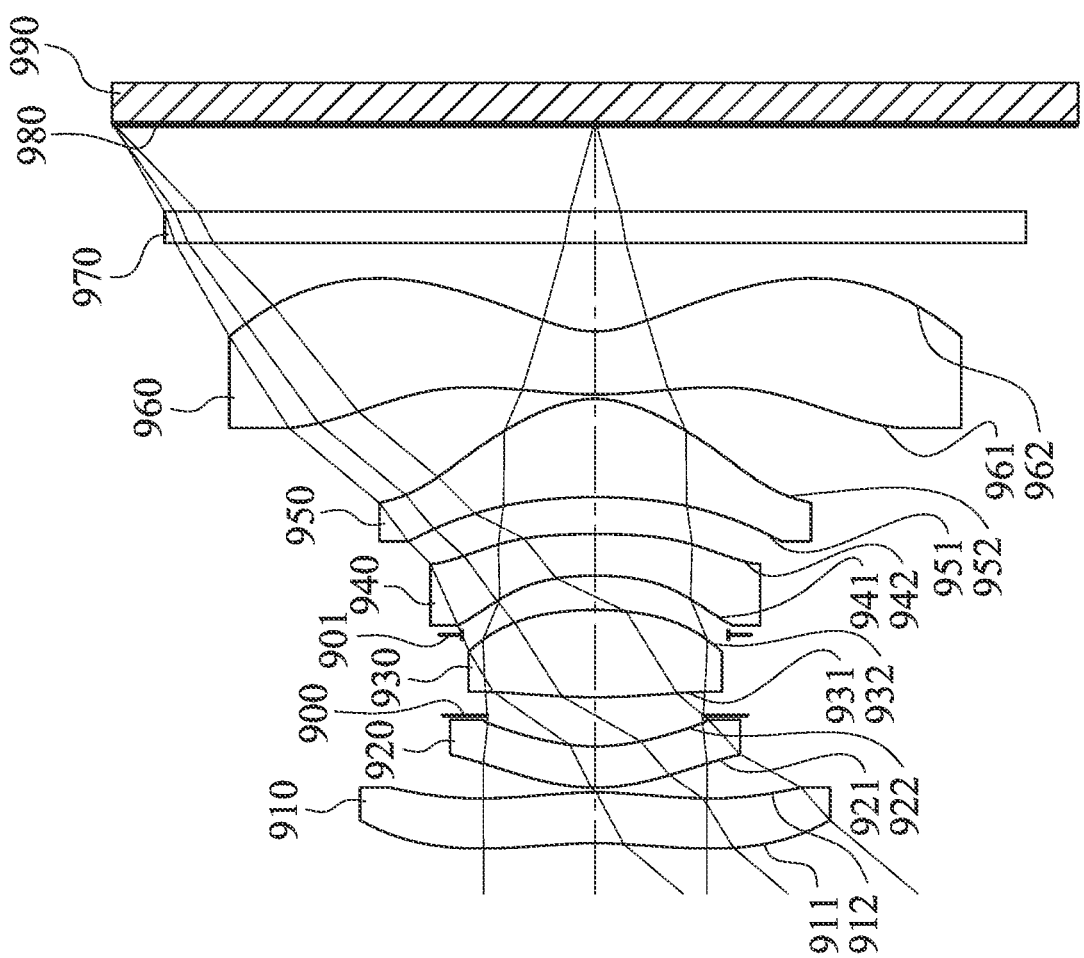
FIG. 17 is a schematic view of an image capturing apparatus according to the 9th embodiment of the present disclosure.
Figure 18:
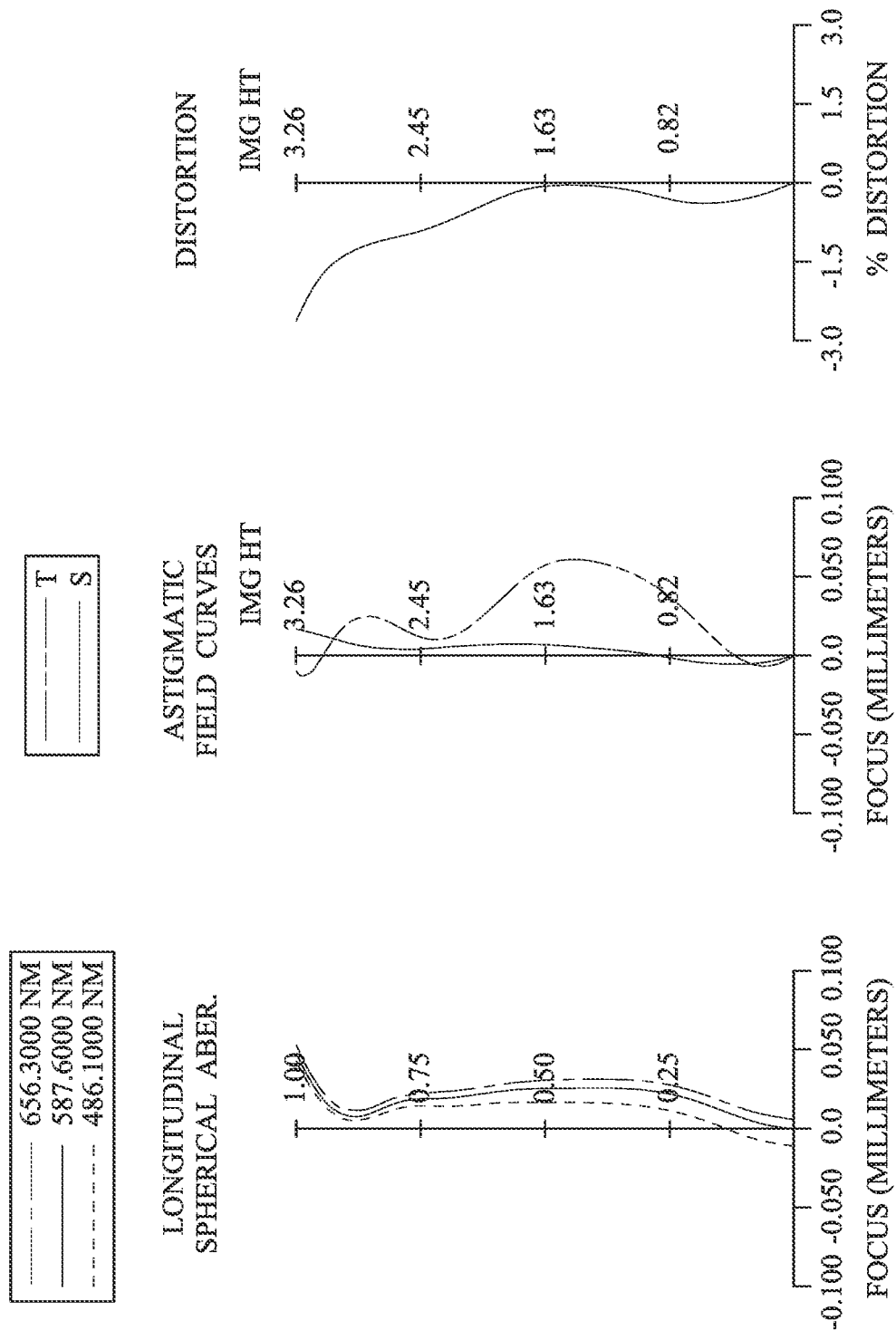
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows spherical aberration curves, astigmatic field curves and a distortion curve of the image capturing apparatus according to the 9th embodiment. In FIG. 17, the image capturing apparatus includes an optical photographing system (its reference numeral is omitted) and an image sensor 990. The optical photographing system includes, in order from an object side to an image side, a first lens element 910, a second lens element 920, an aperture stop 900, a third lens element 930, a stop 901, a fourth lens element 940, a fifth lens element 950, a sixth lens element 960, an IR-cut filter 970 and an image surface 980, wherein the image sensor 990 is disposed on the image surface 980 of the optical photographing system. The optical photographing system has a total of six lens elements (910-960).

The first lens element 910 with positive refractive power has an object-side surface 911 being concave in a paraxial region thereof and an image-side surface 912 being convex in a paraxial region thereof. The first lens element 910 is made of a plastic material, and has the object-side surface 911 and the image-side surface 912 being both aspheric. Furthermore, the object-side surface 911 of the first lens element 910 includes a convex shape in an off-axial region thereof.

The second lens element 920 with negative refractive power has an object-side surface 921 being convex in a paraxial region thereof and an image-side surface 922 being concave in a paraxial region thereof. The second lens element 920 is made of a plastic material, and has the object-side surface 921 and the image-side surface 922 being both aspheric.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric.

The fourth lens element 940 with negative refractive power has an object-side surface 941 being concave in a paraxial region thereof and an image-side surface 942 being convex in a paraxial region thereof. The fourth lens element 940 is made of a plastic material, and has the object-side surface 941 and the image-side surface 942 being both aspheric.

The fifth lens element 950 with positive refractive power has an object-side surface 951 being concave in a paraxial region thereof and an image-side surface 952 being convex in a paraxial region thereof. The fifth lens element 950 is made of a plastic material, and has the object-side surface 951 and the image-side surface 952 being both aspheric.

The sixth lens element 960 with negative refractive power has an object-side surface 961 being convex in a paraxial region thereof and an image-side surface 962 being concave in a paraxial region thereof. The sixth lens element 960 is made of a plastic material, and has the object-side surface 961 and the image-side surface 962 being both aspheric. Furthermore, the image-side surface 962 of the sixth lens element 960 includes at least one convex shape in an off-axial region thereof.

The IR-cut filter 970 is made of a glass material and located between the sixth lens element 960 and the image surface 980, and will not affect the focal length of the optical photographing system.

The detailed optical data of the 9th embodiment are shown in Table 17 and the aspheric surface data are shown in Table 18 below.

TABLE 17

9th Embodiment
f = 2.81 mm, Fno = 1.86, HFOV = 49.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.120 | ASP | 0.343 | Plastic | 1.545 | 56.0 | 20.63 |
| 2 | | −2.536 | ASP | 0.032 | | | | |
| 3 | Lens 2 | 1.397 | ASP | 0.278 | Plastic | 1.584 | 28.2 | −6895.66 |
| 4 | | 1.294 | ASP | 0.211 | | | | |
| 5 | Ape. Stop | Plano | | 0.123 | | | | |
| 6 | Lens 3 | 5.023 | ASP | 0.589 | Plastic | 1.544 | 55.9 | 2.94 |
| 7 | | −2.246 | ASP | −0.168 | | | | |
| 8 | Stop | Plano | | 0.400 | | | | |
| 9 | Lens 4 | −2.154 | ASP | 0.280 | Plastic | 1.660 | 20.4 | −4.36 |
| 10 | | −9.017 | ASP | 0.250 | | | | |
| 11 | Lens 5 | −3.846 | ASP | 0.665 | Plastic | 1.544 | 55.9 | 1.38 |
| 12 | | −0.666 | ASP | 0.030 | | | | |
| 13 | Lens 6 | 3.216 | ASP | 0.424 | Plastic | 1.544 | 55.9 | −1.54 |
| 14 | | 0.633 | ASP | 0.600 | | | | |
| 15 | IR-cut filter | Plano | | 0.210 | Glass | 1.517 | 64.2 | — |
| 16 | | Plano | | 0.590 | | | | |
| 17 | Image | Plano | | — | | | | |

Reference wavelength is 587.6 nm (d-line).
Effective radius of Stop on Surface 8 is 0.900 mm.

TABLE 18

Aspheric Coefficients

| Surface # | 1 | 2 | 3 | 4 | 6 | 7 |
|---|---|---|---|---|---|---|
| k = | −4.1160E+01 | −6.2026E+01 | −1.8875E+00 | −4.0443E+00 | −1.1265E+01 | 7.0964E−01 |
| A4 = | 1.1654E−01 | 9.4912E−02 | 2.4592E−02 | −1.5702E−01 | −1.3950E−02 | −2.0008E−01 |
| A6 = | −8.3571E−02 | −7.7272E−02 | −5.6331E−01 | 7.3495E−01 | −7.2493E−02 | −1.5141E−02 |
| A8 = | 5.7100E−02 | 8.2441E−02 | 1.2874E+00 | −3.1054E+00 | 2.2277E−01 | 1.2715E−01 |
| A10 = | −2.3403E−02 | −5.3583E−02 | −1.7094E+00 | 8.4197E+00 | −6.5830E−01 | −2.2360E−01 |
| A12 = | 5.2354E−03 | 1.6955E−02 | 1.1806E+00 | −1.2246E+01 | 4.0942E−01 | 4.0628E−02 |
| A14 = | −5.0977E−04 | −2.0899E−03 | −3.1363E−01 | 7.6030E+00 | 1.2310E−01 | 5.2848E−03 |
| A16 = | | | | | | 5.9143E−02 |

| Surface # | 9 | 10 | 11 | 12 | 13 | 14 |
|---|---|---|---|---|---|---|
| k = | 1.5772E+00 | −1.6091E+01 | 4.1308E+00 | −3.9628E+00 | −5.5328E+00 | −5.2875E+00 |
| A4 = | −5.3674E−01 | −4.4016E−01 | −9.6970E−02 | −2.3065E−01 | −1.2686E−01 | −8.3348E−02 |
| A6 = | 6.9861E−01 | 7.0161E−01 | 2.0776E−01 | 3.3280E−01 | 2.5341E−02 | 3.1564E−02 |
| A8 = | −1.4189E+00 | −1.1705E+00 | −4.5234E−01 | −4.0034E−01 | −2.3152E−03 | −1.0588E−02 |
| A10 = | 4.3630E+00 | 1.9647E+00 | 6.7031E−01 | 3.1324E−01 | 1.6897E−03 | 2.4239E−03 |
| A12 = | −7.4500E+00 | −2.1306E+00 | −5.4995E−01 | −1.2098E−01 | −6.3541E−04 | −3.4500E−04 |
| A14 = | 6.4482E+00 | 1.2185E+00 | 2.2372E−01 | 1.9709E−02 | 9.0597E−05 | 2.6907E−05 |
| A16 = | −2.1970E+00 | −2.7465E−01 | −3.4843E−02 | −7.9634E−04 | −4.5497E−06 | −8.5730E−07 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 2.81 | |f3/f2| | 0.0004 |
| Fno | 1.86 | |f5/f6| | 0.90 |
| HFOV [deg.] | 49.9 | (|P1| + |P2|)/ (|P3| + |P4|) | 0.09 |
| (V2 + V4)/V3 | 0.87 | Y31/Y11 | 0.49 |
| T45/T34 | 1.08 | Y31/Y21 | 0.79 |
| CT3/CT2 | 2.12 | SD/TD | 0.75 |
| (CT1 + CT2 + CT4)/ | 0.72 | R2/ImgH | −0.78 |

-continued

| 9th Embodiment | | | |
|---|---|---|---|
| (CT3 + CT5)/ | | | |
| R7/f | −0.77 | R7/ImgH | −0.66 |
| \|R2/R1\| | 0.81 | ImgH/f | 1.16 |
| (R3 − R4)/(R3 + R4) | 0.04 | f/TL | 0.58 |
| (R6 − R7)(R6 + R7) | 0.02 | TL [mm] | 4.86 |
| (R7 − R8)/(R7 + R8) | −0.61 | f/EPD | 1.86 |
| (R9 + R10)/(R9 − R10) | 1.42 | f/tan(HFOV) [mm] | 2.36 |
| (R11 − R12)/(R11 + R12) | 0.67 | tan(HFOV) | 1.19 |
| \|f3/f1\| | 0.14 | \|SAG11/Y11\| | 0.10 |

10th Embodiment

Figure 19:
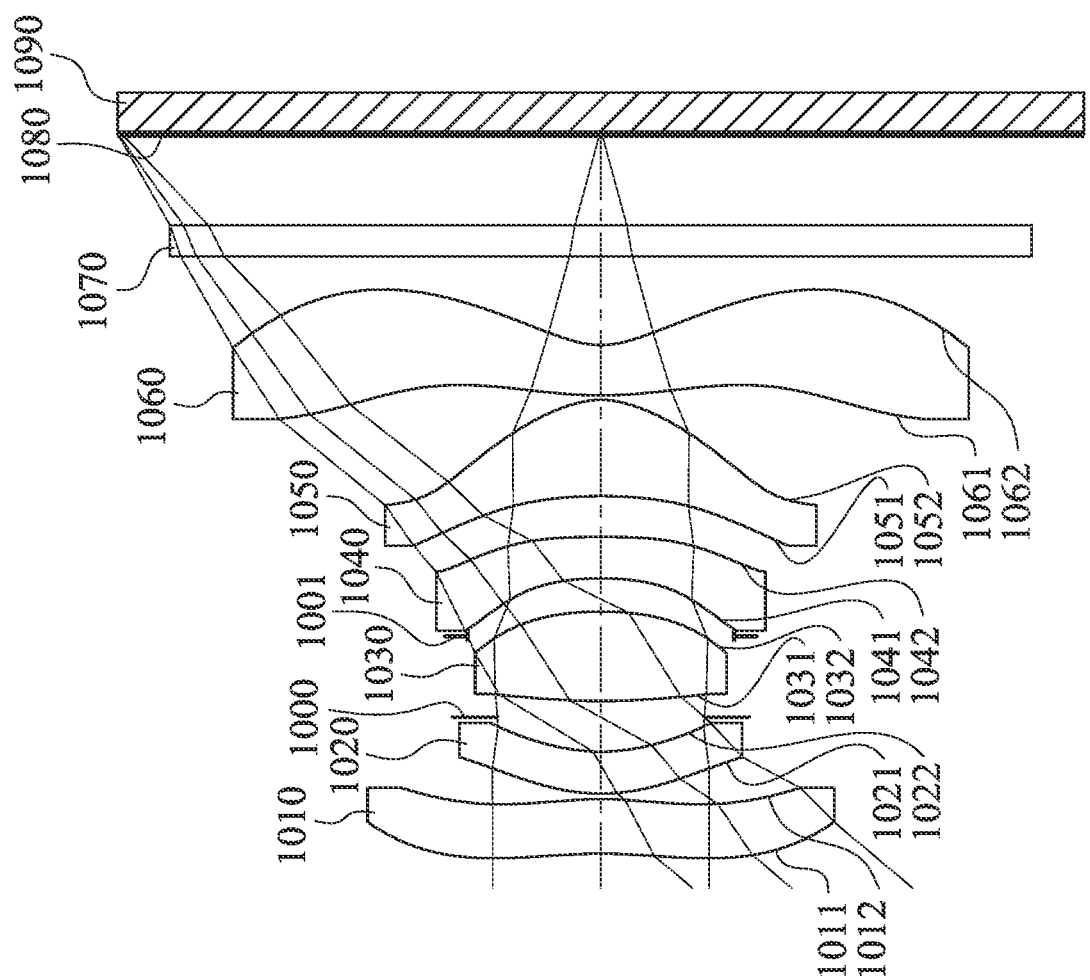
FIG. 19 is a schematic view of an image capturing apparatus according to the 10th embodiment of the present disclosure.
Figure 20:
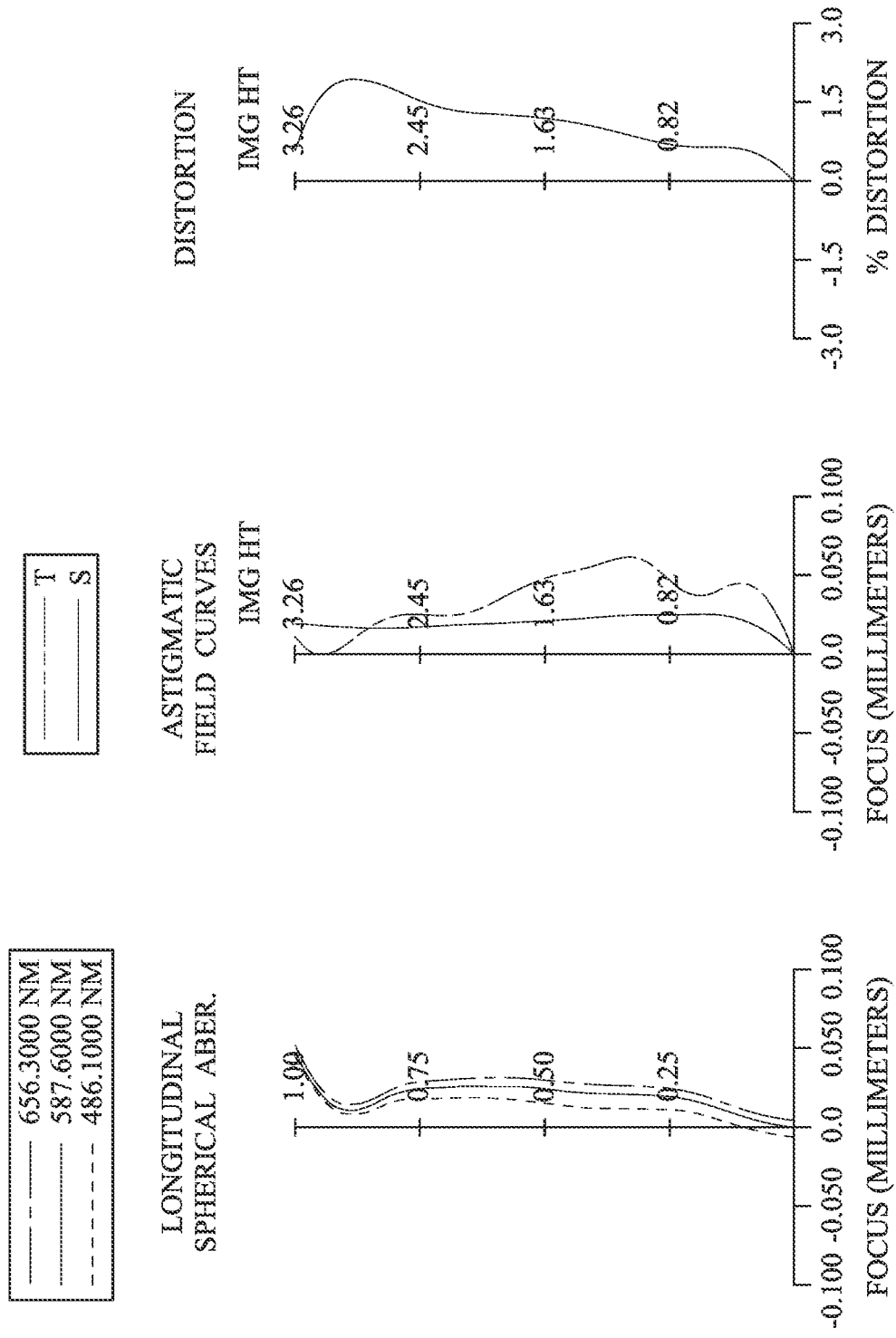
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows spherical aberration curves, astigmatic field curves and a distortion curve of the image capturing apparatus according to the 10th embodiment. In FIG. 19, the image capturing apparatus includes an optical photographing system (its reference numeral is omitted) and an image sensor 1090. The optical photographing system includes, in order from an object side to an image side, a first lens element 1010, a second lens element 1020, an aperture stop 1000, a third lens element 1030, a stop 1001, a fourth lens element 1040, a fifth lens element 1050, a sixth lens element 1060, an IR-cut filter 1070 and an image surface 1080, wherein the image sensor 1090 is disposed on the image surface 1080 of the optical photographing system. The optical photographing system has a total of six lens elements (1010-1060).

The first lens element 1010 with positive refractive power has an object-side surface 1011 being concave in a paraxial region thereof and an image-side surface 1012 being convex in a paraxial region thereof. The first lens element 1010 is made of a plastic material, and has the object-side surface 1011 and the image-side surface 1012 being both aspheric. Furthermore, the object-side surface 1011 of the first lens element 1010 includes a convex shape in an off-axial region thereof.

The second lens element 1020 with negative refractive power has an object-side surface 1021 being convex in a paraxial region thereof and an image-side surface 1022 being concave in a paraxial region thereof. The second lens element 1020 is made of a plastic material, and has the object-side surface 1021 and the image-side surface 1022 being both aspheric.

The third lens element 1030 with positive refractive power has an object-side surface 1031 being convex in a paraxial region thereof and an image-side surface 1032 being convex in a paraxial region thereof. The third lens element 1030 is made of a plastic material, and has the object-side surface 1031 and the image-side surface 1032 being both aspheric.

The fourth lens element 1040 with negative refractive power has an object-side surface 1041 being concave in a paraxial region thereof and an image-side surface 1042 being convex in a paraxial region thereof. The fourth lens element 1040 is made of a plastic material, and has the object-side surface 1041 and the image-side surface 1042 being both aspheric.

The fifth lens element 1050 with positive refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric.

The sixth lens element 1060 with negative refractive power has an object-side surface 1061 being convex in a paraxial region thereof and an image-side surface 1062 being concave in a paraxial region thereof. The sixth lens element 1060 is made of a plastic material, and has the object-side surface 1061 and the image-side surface 1062 being both aspheric. Furthermore, the image-side surface 1062 of the sixth lens element 1060 includes at least one convex shape in an off-axial region thereof.

The IR-cut filter 1070 is made of a glass material and located between the sixth lens element 1060 and the image surface 1080, and will not affect the focal length of the optical photographing system.

The detailed optical data of the 10th embodiment are shown in Table 19 and the aspheric surface data are shown in Table 20 below.

TABLE 19

10th Embodiment
f = 2.72 mm, Fno = 1.86, HFOV = 49.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −3.283 | ASP | 0.368 | Plastic | 1.545 | 56.1 | 12.10 |
| 2 | | −2.279 | ASP | 0.039 | | | | |
| 3 | Lens 2 | 1.453 | ASP | 0.281 | Plastic | 1.639 | 23.3 | −19.35 |
| 4 | | 1.202 | ASP | 0.233 | | | | |
| 5 | Ape. Stop | Plano | | 0.110 | | | | |
| 6 | Lens 3 | 4.893 | ASP | 0.605 | Plastic | 1.544 | 56.0 | 2.78 |
| 7 | | −2.096 | ASP | −0.166 | | | | |
| 8 | Stop | Plano | | 0.390 | | | | |
| 9 | Lens 4 | −2.147 | ASP | 0.280 | Plastic | 1.660 | 20.4 | −4.23 |
| 10 | | −9.819 | ASP | 0.276 | | | | |
| 11 | Lens 5 | −3.297 | ASP | 0.650 | Plastic | 1.544 | 56.0 | 1.19 |
| 12 | | −0.577 | ASP | 0.030 | | | | |
| 13 | Lens 6 | 2.635 | ASP | 0.340 | Plastic | 1.544 | 56.0 | −1.34 |
| 14 | | 0.546 | ASP | 0.600 | | | | |
| 15 | IR-cut filter | Plano | | 0.210 | Glass | 1.517 | 64.2 | — |
| 16 | | Plano | | 0.616 | | | | |
| 17 | Image | Plano | | — | | | | |

Reference wavelength is 587.6 nm (d-line).
Effective radius of Stop on Surface 8 is 0.900 mm.

TABLE 20

| Aspheric Coefficients | | | | | | |
|---|---|---|---|---|---|---|
| Surface # | 1 | 2 | 3 | 4 | 6 | 7 |
| k = | −4.0619E+01 | −5.7763E+01 | −1.0557E+00 | −3.2948E+00 | 8.3268E+00 | −1.7273E−03 |
| A4 = | 1.2686E−01 | 1.6574E−01 | 1.4110E−01 | −1.8771E−01 | −1.2043E−02 | −2.1747E−01 |
| A6 = | −7.5206E−02 | −1.7773E−01 | −8.6294E−01 | 1.3353E+00 | −1.2088E−01 | 5.2296E−02 |
| A8 = | 4.1736E−02 | 1.8210E−01 | 1.8594E+00 | −5.8925E+00 | 4.5203E−01 | 2.2051E−01 |
| A10 = | −1.2744E−02 | −1.1075E−01 | −2.4551E+00 | 1.6006E+01 | −1.0980E+00 | −1.3956E+00 |
| A12 = | 1.8403E−03 | 3.3361E−02 | 1.6801E+00 | −2.3521E+01 | 9.4111E−01 | 3.1702E+00 |
| A14 = | −8.7912E−05 | −3.8678E−03 | −4.4560E−01 | 1.4618E+01 | −6.0655E−02 | −3.6860E+00 |
| A16 = | | | | | | 1.7718E+00 |
| Surface # | 9 | 10 | 11 | 12 | 13 | 14 |
| k = | 1.9284E+00 | 5.9737E+01 | 3.4169E+00 | −4.4313E+00 | −4.1982E+00 | −5.2896E+00 |
| A4 = | −5.4828E−01 | −4.4759E−01 | −1.3594E−01 | −4.0465E−01 | −1.5162E−01 | −8.5666E−02 |
| A6 = | 7.1024E−01 | 7.0064E−01 | 1.4882E−01 | 6.7910E−01 | 7.2767E−02 | 3.4476E−02 |
| A8 = | −1.2502E+00 | −1.0311E+00 | −2.6927E−01 | −9.4252E−01 | −3.1960E−02 | −1.1979E−02 |
| A10 = | 3.3730E+00 | 1.5512E+00 | 5.8391E−01 | 8.6832E−01 | 1.0625E−02 | 2.7253E−03 |
| A12 = | −5.9399E+00 | −1.6916E+00 | −6.2753E−01 | −4.3065E−01 | −2.0960E−03 | −3.7192E−04 |
| A14 = | 5.5659E+00 | 1.0144E+00 | 3.1384E−01 | 1.0642E−01 | 2.1703E−04 | 2.7234E−05 |
| A16 = | −2.0181E+00 | −2.3810E−01 | −5.9291E−02 | −1.0441E−02 | −9.1577E−06 | −8.0664E−07 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table as the following values and satisfy the following conditions:

| 10th Embodiment | | | |
|---|---|---|---|
| f [mm] | 2.72 | |f3/f2| | 0.14 |
| Fno | 1.86 | |f5/f6| | 0.88 |
| HFOV [deg.] | 49.9 | (|P1| + |P2|)/(|P3| + |P4|) | 0.23 |
| (V2 + V4)/V3 | 0.78 | Y31/Y11 | 0.48 |
| T45/T34 | 1.23 | Y31/Y21 | 0.79 |
| CT3/CT2 | 2.15 | SD/TD | 0.73 |
| (CT1 + CT2 + CT4)/(CT3 + CT5) | 0.74 | R2/ImgH | −0.70 |
| R7/f | −0.79 | R7/ImgH | −0.66 |
| |R2/R1| | 0.69 | ImgH/f | 1.20 |
| (R3 − R4)/(R3 + R4) | 0.09 | f/TL | 0.56 |
| (R6 − R7)(R6 + R7) | −0.01 | TL [mm] | 4.86 |
| (R7 − R8)/(R7 + R8) | −0.64 | f/EPD | 1.86 |
| (R9 + R10)/(R9 − R10) | 1.42 | f/tan(HFOV) [mm] | 2.29 |
| (R11 − R12)/(R11 + R12) | 0.66 | tan(HFOV) | 1.19 |
| |f3/f1| | 0.23 | |SAG11/Y11| | 0.14 |

11th Embodiment

Figure 22:
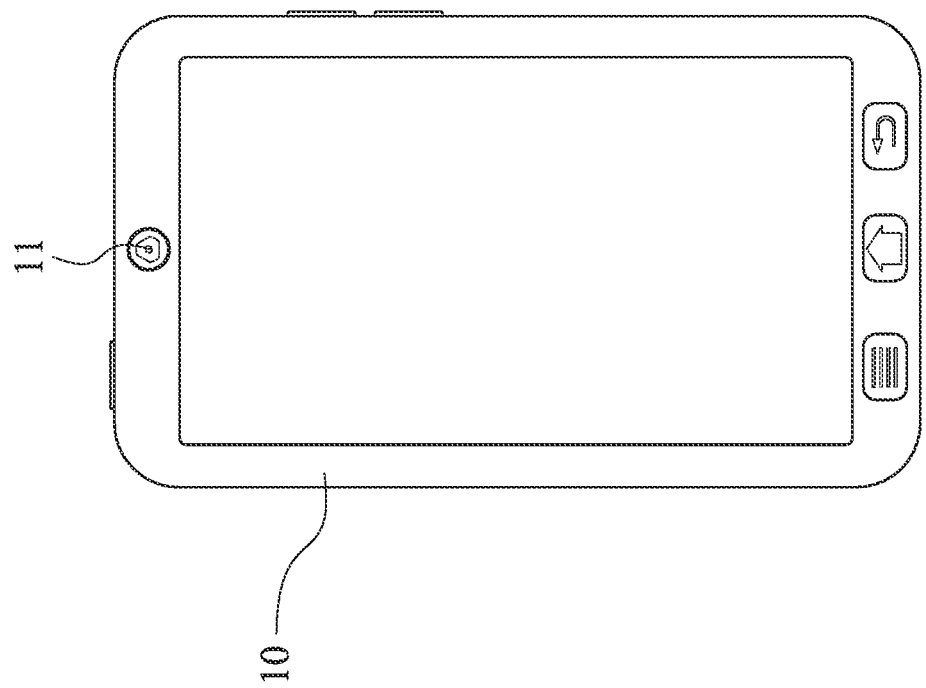
FIG. 22 is a schematic view of an electronic device according to the 11th embodiment of the present disclosure.

FIG. 22 is a schematic view of an electronic device 10 according to the 11th embodiment of the present disclosure. The electronic device 10 of the 11th embodiment is a smartphone, wherein the electronic device 10 includes an image capturing device 11. The image capturing device 11 includes an optical photographing system (its reference numeral is omitted) according to the present disclosure and an image sensor (its reference numeral is omitted), wherein the image sensor is disposed on an image surface of the optical photographing system.

12th Embodiment

Figure 23:
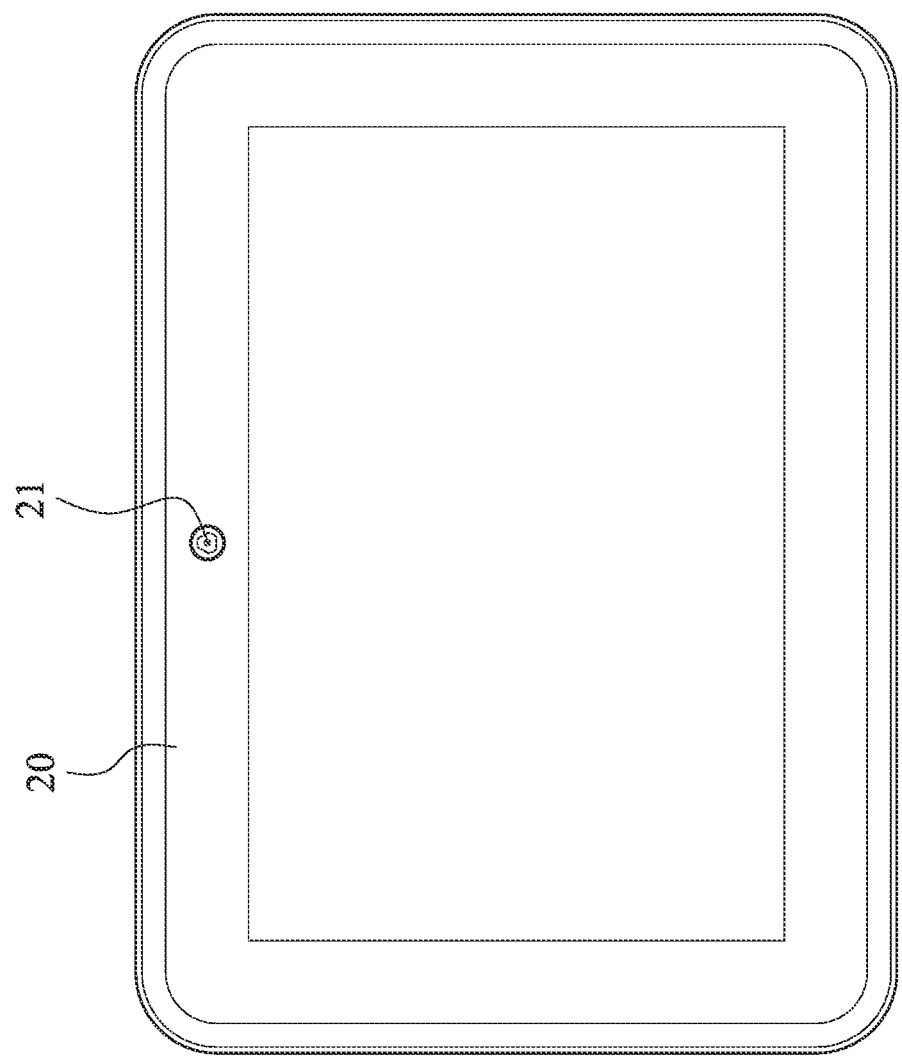
FIG. 23 is a schematic view of an electronic device according to the 12th embodiment of the present disclosure.

FIG. 23 is a schematic view of an electronic device 20 according to the 12th embodiment of the present disclosure. The electronic device 20 of the 12th embodiment is a tablet personal computer, wherein the electronic device 20 includes an image capturing device 21. The image capturing device 21 includes an optical photographing system (its reference numeral is omitted) according to the present disclosure and an image sensor (its reference numeral is omitted), wherein the image sensor is disposed on an image surface of the optical photographing system.

13th Embodiment

Figure 24:
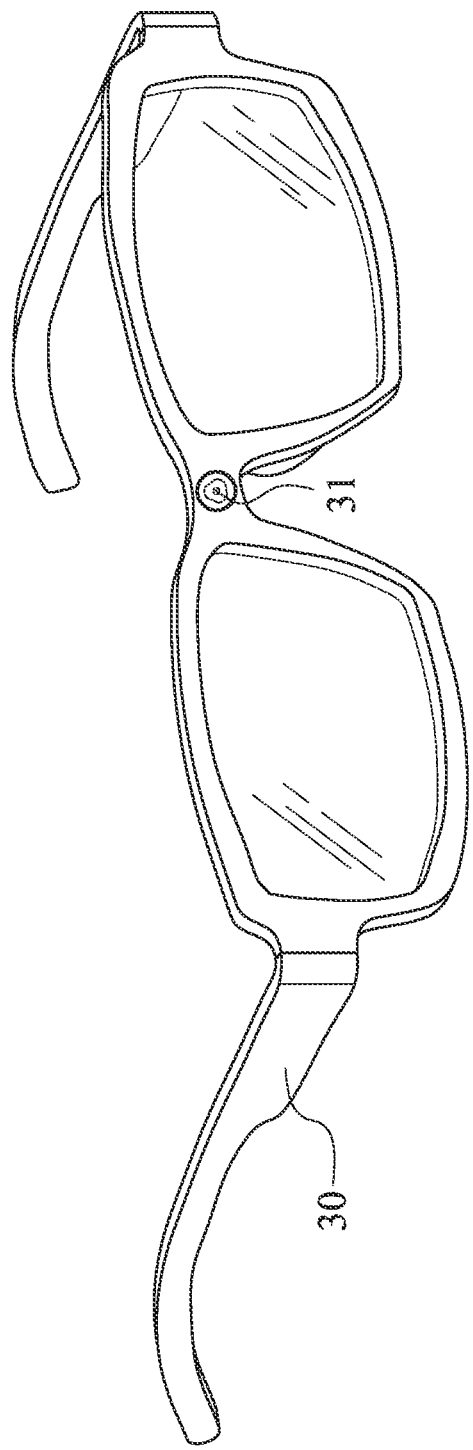
FIG. 24 is a schematic view of an electronic device according to the 13th embodiment of the present disclosure.

FIG. 24 is a schematic view of an electronic device 30 according to the 13th embodiment of the present disclosure. The electronic device 30 of the 13th embodiment is a wearable device, wherein the electronic device 30 includes an image capturing device 31. The image capturing device 31 includes an optical photographing system (its reference numeral is omitted) according to the present disclosure and an image sensor (its reference numeral is omitted), wherein the image sensor is disposed on an image surface of the optical photographing system.

The foregoing description, for purpose of explanation, has been described with reference to specific embodiments. It is to be noted that Tables 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical photographing system comprising six lens elements, the six lens elements being, in order from an object side to an image side:
a first lens element, a second lens element, a third lens element, a fourth lens element, a fifth lens element and a sixth lens element; each of the six lens elements has an object-side surface towards the object side and an image-side surface towards the image side;

wherein the object-side surface of the first lens element is concave in a paraxial region thereof; the object-side surface of the first lens element comprises at least one convex shape in an off-axis region thereof; the image-side surface of the second lens element is concave in a paraxial region thereof;

wherein a total number of lens elements of the optical photographing system is six; an absolute value of a curvature radius of the object-side surface of the fifth lens element is larger than an absolute value of a curvature radius of the object-side surface of the first lens element;

wherein an Abbe number of the second lens element is V2, an Abbe number of the third lens element is V3, an Abbe number of the fourth lens element is V4, a half of a maximum field of view of the optical photographing system is HFOV, a central thickness of the first lens element is CT1, a central thickness of the second lens element is CT2, a central thickness of the third lens element is CT3, a central thickness of the fourth lens element is CT4, a central thickness of the fifth lens element is CT5, and the following conditions are satisfied:

$0.20<(V2+V4)/V3<1.0;$ $1.10 \leq \tan(HFOV)<2.5;$ and $(CT1+CT2+CT4)/(CT3+CT5) \leq 0.72.$ 2. The optical photographing system of claim 1, wherein the second lens element has positive refractive power; the image-side surface of the fifth lens element is convex in a paraxial region thereof; a focal length of the second lens element is f2, a focal length of the third lens element is f3, and the following condition is satisfied:

$0.12 \leq |f3/f2|<1.0.$

3. The optical photographing system of claim 1, wherein the object-side surface of the sixth lens element is convex in a paraxial region thereof, the image-side surface of the sixth lens element is concave in a paraxial region thereof; an axial distance between the third lens element and the fourth lens element is T34, an axial distance between the fourth lens element and the fifth lens element is T45, and the following condition is satisfied:

$0<T45/T34<2.0.$

4. The optical photographing system of claim 1, further comprising:

an aperture stop, wherein an axial distance between the aperture stop and the image-side surface of the sixth lens element is SD, an axial distance between the object-side surface of the first lens element and the image-side surface of the sixth lens element is TD, and the following condition is satisfied:

$0.70<SD/TD<0.93.$

5. The optical photographing system of claim 1, wherein the first lens element has negative refractive power; a focal length of the optical photographing system is f, an entrance pupil diameter of the optical photographing system is EPD, and the following condition is satisfied:

$1.0<f/EPD<2.20.$

6. The optical photographing system of claim 1, wherein a displacement in parallel with an optical axis from an axial vertex on the object-side surface of the first lens element to a maximum effective radius position on the object-side surface of the first lens element is SAG11, a maximum effective radius of the object-side surface of the first lens element is Y11, and the following condition is satisfied:

$|SAG11/Y11|<0.20.$

7. The optical photographing system of claim 1, wherein a curvature radius of the image-side surface of the first lens element and a curvature radius of the image-side surface of the fourth lens element have the same sign.

8. The optical photographing system of claim 1, wherein the absolute value of the curvature radius of the object-side surface of the fifth lens element is larger than an absolute value of a curvature radius of the image-side surface of the second lens element.

9. The optical photographing system of claim 1, wherein a curvature radius of the object-side surface of the fourth lens element and a curvature radius of the image-side surface of the fourth lens element have the same sign.

10. The optical photographing system of claim 1, wherein an axial distance between the first lens element and the second lens element is larger than an axial distance between the fifth lens element and the sixth lens element.

11. An image capturing apparatus, comprising:
the optical photographing system of claim 1; and
an image sensor disposed on an image surface of the optical photographing system.

12. An electronic device, comprising:
the image capturing apparatus of claim 11.

13. An optical photographing system comprising six lens elements, the six lens elements being, in order from an object side to an image side:

a first lens element, a second lens element, a third lens element, a fourth lens element, a fifth lens element and a sixth lens element; each of the six lens elements has an object-side surface towards the object side and an image-side surface towards the image side;

wherein the object-side surface of the first lens element is concave in a paraxial region thereof; the object-side surface of the first lens element comprises at least one convex shape in an off-axis region thereof; the image-side surface of the second lens element is concave in a paraxial region thereof; the sixth lens element has negative refractive power;

wherein a total number of lens elements of the optical photographing system is six; a central thickness of the sixth lens element is larger than an axial distance between the second lens element and the third lens element; an absolute value of a curvature radius of the object-side surface of the third lens element is larger than an absolute value of a curvature radius of the image-side surface of the first lens element;

wherein an Abbe number of the second lens element is V2, an Abbe number of the third lens element is V3, an Abbe number of the fourth lens element is V4, a half of a maximum field of view of the optical photographing system is HFOV, a curvature radius of the object-side surface of the fifth lens element is R9, a curvature radius of the image-side surface of the fifth lens element is R10, and the following conditions are satisfied:

$0.20<(V2+V4)/V3<1.0;$ $1.10 \leq \tan(HFOV)<2.5;$ and $-5.0<(R9+R10)/(R9 \ominus R10) \leq 1.45.$

14. The optical photographing system of claim 13, wherein the image-side surface of the third lens element is convex in a paraxial region thereof; a focal length of the second lens element is f2, a focal length of the third lens element is f3, and the following condition is satisfied:

$$0.12 \leq |f3/f2| < 1.0.$$

15. The optical photographing system of claim 13, wherein an axial distance between the third lens element and the fourth lens element is T34, an axial distance between the fourth lens element and the fifth lens element is T45, and the following condition is satisfied:

$$0 < T45/T34 < 2.0.$$

16. The optical photographing system of claim 13, wherein a focal length of the fifth lens element is f5, a focal length of the sixth lens element is f6, and the following condition is satisfied:

$$0.70 < |f5/f6| < 1.0.$$

17. The optical photographing system of claim 13, wherein the central thickness of the sixth lens element is larger than an axial distance between the first lens element and the second lens element.

18. The optical photographing system of claim 13, wherein the absolute value of the curvature radius of the object-side surface of the third lens element is larger than an absolute value of a curvature radius of the object-side surface of the second lens element.

19. The optical photographing system of claim 13, wherein an axial distance between the third lens element and the fourth lens element is larger than an axial distance between the fifth lens element and the sixth lens element.

20. The optical photographing system of claim 13, wherein an axial distance between the first lens element and the second lens element is larger than an axial distance between the fifth lens element and the sixth lens element.

21. The optical photographing system of claim 13, wherein an absolute value of a focal length of the optical photographing system is larger than an absolute value of a focal length of the fifth lens element.

* * * * *

UNITED STATES PATENT AND TRADEMARK OFFICE
CERTIFICATE OF CORRECTION

PATENT NO. : 11,982,794 B2  
APPLICATION NO. : 18/172400  
DATED : May 14, 2024  
INVENTOR(S) : Chun-Che Hsueh, Yu-Tai Tseng and Hsin-Hsuan Huang Page 1 of 1

It is certified that error appears in the above-identified patent and that said Letters Patent is hereby corrected as shown below:

In the Claims (1) In Column 43, Line 26 (in Claim 1), immediately following "(V2+V4)", please insert --/--.
(2) In Column 44, Line 63 (in Claim 13), immediately following "(V2+V4)N3", please delete "N3" and insert therefore --/V3--.
(3) In Column 44, Line 67 (in Claim 13), please delete "⊕" and insert therefore -- - --.

Signed and Sealed this  
Sixteenth Day of July, 2024

Katherine Kelly Vidal  
*Director of the United States Patent and Trademark Office*